US009965770B2

(12) United States Patent
Mason-Gugenheim et al.

(10) Patent No.: US 9,965,770 B2
(45) Date of Patent: May 8, 2018

(54) SYSTEMS AND METHODS FOR INTELLIGENT COUPON DISTRIBUTION, REDEMPTION, AND TRACKING

(71) Applicant: CLIPCART CORP., Boca Raton, FL (US)

(72) Inventors: Nancy Mason-Gugenheim, Boca Raton, FL (US); Jessica Ramirez-Gugenheim, Boca Raton, FL (US)

(73) Assignee: CLIPCART CORP., Boca Raton, FL (US)

( * ) Notice: Subject to any disclaimer, the term of this patent is extended or adjusted under 35 U.S.C. 154(b) by 0 days. days.

(21) Appl. No.: 15/419,896

(22) Filed: Jan. 30, 2017

(65) Prior Publication Data
US 2017/0228760 A1 Aug. 10, 2017

Related U.S. Application Data

(60) Provisional application No. 62/291,305, filed on Feb. 4, 2016.

(51) Int. Cl.
| | | |
|---|---|---|
| G06Q 30/00 | (2012.01) |
| G06Q 30/02 | (2012.01) |
| G06K 19/06 | (2006.01) |
| H04W 4/02 | (2018.01) |
| G06Q 20/20 | (2012.01) |
| G06Q 30/04 | (2012.01) |
| G06Q 20/10 | (2012.01) |

(52) U.S. Cl.
CPC ... *G06Q 30/0238* (2013.01); *G06K 19/06028* (2013.01); *G06K 19/06112* (2013.01); *G06Q 20/102* (2013.01); *G06Q 20/202* (2013.01); *G06Q 30/0239* (2013.01); *G06Q 30/04* (2013.01); *H04W 4/02* (2013.01)

(58) Field of Classification Search
None
See application file for complete search history.

(56) References Cited

U.S. PATENT DOCUMENTS

| | | |
|---|---|---|
| 5,855,007 A | 12/1998 | Jovicic |
| 6,691,915 B1 | 2/2004 | Thaxton et al. |
| 8,046,257 B2 | 10/2011 | Wane et al. |
| 8,560,383 B2 | 10/2013 | Davis et al. |

(Continued)

OTHER PUBLICATIONS

An International Search Report and the Written Opinion of the International Searching Authority dated Apr. 10, 2017 in connections with International application No. PCT/US2017/015675.

*Primary Examiner* — Matthew T Sittner
(74) *Attorney, Agent, or Firm* — Baker & McKenzie LLP

(57) ABSTRACT

Embodiments disclosed herein may be directed to the intelligent distribution, redemption, and tracking of coupons. Modernized couponing processes described herein may provide meaningful synergy between three different parties, namely the shopper, the retailer, and the product supplier. For example, while shopping at a retailer, a shopper may use their device to scan a barcode of a product that they wish to purchase. Based on the scanned barcode, relevant coupon offers associated are identified and presented to the shopper on the user device. The shopper may then select one or more coupon offers to be redeemed at the point of sale.

21 Claims, 12 Drawing Sheets

(56) References Cited

U.S. PATENT DOCUMENTS

| | | | |
|---|---|---|---|
| 8,694,367 B2 | 4/2014 | Eichstaedt et al. | |
| 2001/0039514 A1* | 11/2001 | Barenbaum | G06Q 20/32 |
| | | | 705/14.35 |
| 2002/0055875 A1 | 5/2002 | Schulze, Jr. | |
| 2002/0194067 A1 | 12/2002 | Wechsler | |
| 2003/0135414 A1* | 7/2003 | Tai | G06Q 20/387 |
| | | | 705/14.1 |
| 2004/0249712 A1* | 12/2004 | Brown | G06Q 30/02 |
| | | | 705/14.19 |
| 2005/0091112 A1 | 4/2005 | Wechsler | |
| 2005/0251440 A1* | 11/2005 | Bednarek | G06Q 30/0201 |
| | | | 705/7.32 |
| 2006/0053437 A1* | 3/2006 | Bruner | G06Q 20/045 |
| | | | 725/23 |
| 2006/0149627 A1 | 7/2006 | Brown | |
| 2006/0167714 A1* | 7/2006 | Birch | G06Q 10/10 |
| | | | 705/37 |
| 2008/0010114 A1 | 1/2008 | Head | |
| 2008/0041950 A1* | 2/2008 | Michels | G06Q 20/342 |
| | | | 235/419 |
| 2008/0077486 A1 | 3/2008 | Davis | |
| 2009/0026255 A1* | 1/2009 | Besecker | G06Q 20/208 |
| | | | 235/375 |
| 2009/0144164 A1 | 6/2009 | Wane et al. | |
| 2009/0299834 A1 | 12/2009 | Wilson | |
| 2010/0114683 A1 | 5/2010 | Wessels et al. | |
| 2010/0276484 A1* | 11/2010 | Banerjee | G06Q 30/06 |
| | | | 235/379 |
| 2011/0302023 A1 | 12/2011 | Thye | |
| 2011/0313870 A1* | 12/2011 | Eicher | G06Q 20/20 |
| | | | 705/16 |
| 2012/0066048 A1* | 3/2012 | Foust | G06Q 20/387 |
| | | | 705/14.26 |
| 2012/0123847 A1 | 5/2012 | Wane | |
| 2012/0134708 A1 | 5/2012 | Asaka | |
| 2012/0136698 A1 | 5/2012 | Kent | |
| 2012/0136706 A1 | 5/2012 | Chang et al. | |
| 2012/0136707 A1 | 5/2012 | Chang et al. | |
| 2012/0136710 A1 | 5/2012 | Chang et al. | |
| 2012/0215611 A1 | 8/2012 | Korson | |
| 2012/0284107 A1 | 11/2012 | Gernaat | |
| 2012/0296725 A1* | 11/2012 | Dessert | G06Q 30/0208 |
| | | | 705/14.27 |
| 2012/0310715 A1 | 12/2012 | Singhal | |
| 2013/0024254 A1 | 1/2013 | Libenson et al. | |
| 2013/0024257 A1 | 1/2013 | Libenson et al. | |
| 2013/0024262 A1 | 1/2013 | Libenson et al. | |
| 2013/0024267 A1 | 1/2013 | Libenson et al. | |
| 2013/0030934 A1* | 1/2013 | Bakshi | G06Q 20/40 |
| | | | 705/18 |
| 2013/0041737 A1* | 2/2013 | Mishra | G06Q 30/0207 |
| | | | 705/14.26 |
| 2013/0130652 A1* | 5/2013 | Deasy | C09J 7/041 |
| | | | 455/411 |
| 2013/0159119 A1* | 6/2013 | Henderson | G06Q 20/3224 |
| | | | 705/21 |
| 2013/0166332 A1* | 6/2013 | Hammad | G06Q 40/10 |
| | | | 705/5 |
| 2013/0179250 A1* | 7/2013 | Nguyen | G06Q 20/387 |
| | | | 705/14.36 |
| 2013/0226700 A1 | 8/2013 | Lewis | |
| 2013/0262198 A1* | 10/2013 | Chung | G06Q 30/0226 |
| | | | 705/14.1 |
| 2014/0006129 A1* | 1/2014 | Heath | G06Q 30/0222 |
| | | | 705/14.23 |
| 2014/0012689 A1* | 1/2014 | Henderson | G06Q 20/3224 |
| | | | 705/18 |
| 2014/0025492 A1* | 1/2014 | Donlan | G06Q 30/0207 |
| | | | 705/14.53 |
| 2014/0040128 A1* | 2/2014 | Park | G06Q 20/108 |
| | | | 705/42 |
| 2014/0045515 A1* | 2/2014 | Austin | H04W 4/04 |
| | | | 455/456.1 |
| 2014/0058818 A1 | 2/2014 | Drozd et al. | |
| 2014/0058863 A1* | 2/2014 | Biswas | G06Q 20/354 |
| | | | 705/21 |
| 2014/0114842 A1* | 4/2014 | Blackhurst | G06Q 30/06 |
| | | | 705/39 |
| 2014/0214514 A1 | 7/2014 | Rector et al. | |
| 2014/0249903 A1* | 9/2014 | Preston | G06Q 30/0222 |
| | | | 705/14.22 |
| 2014/0278881 A1 | 9/2014 | Mann et al. | |
| 2014/0297382 A1* | 10/2014 | Chiussi | G06Q 30/0225 |
| | | | 705/14.26 |
| 2015/0065107 A1* | 3/2015 | Dave | H04M 1/72572 |
| | | | 455/418 |
| 2015/0088607 A1* | 3/2015 | Georgoff | G06Q 30/0246 |
| | | | 705/7.31 |
| 2015/0112774 A1* | 4/2015 | Georgoff | G06Q 30/0273 |
| | | | 705/14.1 |
| 2015/0134431 A1* | 5/2015 | Georgoff | G06Q 30/0207 |
| | | | 705/14.13 |
| 2015/0206203 A1* | 7/2015 | Tietzen | G06Q 30/0279 |
| | | | 705/14.3 |
| 2015/0248664 A1* | 9/2015 | Makhdumi | G06Q 20/3274 |
| | | | 235/380 |
| 2015/0287028 A1* | 10/2015 | DeLuca | G06Q 20/382 |
| | | | 705/44 |
| 2015/0302456 A1* | 10/2015 | Rego | G06Q 30/0235 |
| | | | 705/14.35 |
| 2015/0332302 A1* | 11/2015 | Celikyilmaz | G06Q 30/00 |
| | | | 705/14.23 |
| 2015/0363812 A1* | 12/2015 | McMillan | G06Q 30/0225 |
| | | | 705/14.26 |
| 2015/0379552 A1 | 12/2015 | Kent et al. | |
| 2015/0379554 A1* | 12/2015 | Copeland | G06Q 30/0239 |
| | | | 705/14.39 |
| 2016/0034940 A1* | 2/2016 | VanNoller | G06Q 30/0225 |
| | | | 705/14.26 |
| 2016/0035248 A1* | 2/2016 | Gibbs | G06T 7/0002 |
| | | | 434/127 |
| 2016/0104206 A1* | 4/2016 | Greenberg | G06Q 30/0272 |
| | | | 705/14.68 |
| 2016/0210605 A1* | 7/2016 | Vaish | G06Q 20/12 |
| 2016/0364744 A1* | 12/2016 | Stone | G06Q 30/0233 |

* cited by examiner

SYSTEMS AND METHODS FOR INTELLIGENT COUPON DISTRIBUTION, REDEMPTION, AND TRACKING

CROSS REFERENCE TO RELATED APPLICATION

This application claims priority to U.S. Provisional Patent Application No. 62/291,305, filed on Feb. 4, 2016, the disclosure of which is hereby incorporated by reference in entirety.

BACKGROUND

The present disclosure relates to systems and methods for coupon distribution, redemption and tracking.

From a shopper's perspective, clipping coupons out of a newspaper or magazine is time-consuming and produces an unnecessary amount of waste. Product suppliers and retailers may be disinterested in processing paper coupons because tracking them throughout the redemption and clearing phases is cumbersome and expensive in both time and money.

From a retailer's perspective, at the end of every day, each store has to balance the value of each register, collect the coupons and prepare them for redemption. Manufacturer coupons typically include a physical mailing address, but with thousands and thousands of coupons to process each week, few stores have the time or staff to sort through them all and send coupons back to individual manufacturer. Thus, clearing houses are typically used to take on the hard work of processing coupons.

The clearing house acts as the middle man for reimbursement, issuing invoices to manufacturers for coupons submitted for their products during the specified period. Some clearinghouses receive the reimbursement back from the manufacturer and then send payment to the retailer while others invoice on behalf of the retailer with the manufacturer reimbursing the retailer directly.

The clearing house process has significant issues when the clearinghouse processes expired, counterfeit or fraudulent coupons. If a store accepts many fraudulent coupons, it may not receive reimbursement for them or a manufacturer may request an audit of the store to determine whether it can prove that it stocked and sold the number of items for the corresponding coupons processed.

Attempts have been made to address the problems of the clearinghouse process but they have not been effective often focusing only on the electronic processing of the clearing house function and not addressing the user experience. As such, there is need for efficient and environmentally-conscious modernization of coupon redemption processes.

BRIEF SUMMARY

In an embodiment, a user device includes at least one computer readable storage including instructions, and at least one processing device configured to execute the instructions. Executing the instructions causes the at least one processing device to perform the operations of: receiving, from an input device of the user device, information representing identifying indicia associated with a product; identifying, using the computer readable storage or a communications interface of the user device, at least one coupon offer relevant to the first product based on the information representing the identifying indicia; presenting, using a display of the user device, an option to select the at least one coupon offer to a user; receiving the user's selection of the displayed at least one coupon offer to a user; storing the user's selection as at least one selected coupon offer; receiving an instruction from the user to recall the stored user selection; and generating a redemption code that represents the at least one selected coupon offer for redemption at a point-of-sale (POS) terminal.

In another embodiment, a server includes at least one computer readable storage including instructions, and at least one processing device configured to execute the instructions. Executing the instructions causes the at least one processing device to perform the operations of: receiving, from a user device, information representing selected coupon offers; associating a redemption code with the information representing selected coupon offers; storing the redemption code; receiving, from a retailer device, information regarding a sale of products to a user of the user device, the information including information representing a terminal used in the sale to the user and information representing the redemption code; determining offers of the selected coupon offers redeemed in the sale of products to the user based on the stored redemption code, the received redemption code, and information of products included in the same received from the user; storing a record of the offers determined to be redeemed; and generating an invoice to a manufacturer associated with the offers determined to be redeemed.

In still another embodiment, a method includes: receiving, from an input device of a user device, information representing identifying indicia associated with a product; identifying, using a local computer readable storage or a communications interface of the user device, at least one coupon offer relevant to the first product based on the information representing the identifying indicia; presenting, using a display of the user device, an option to select the at least one coupon offer to a user; receiving the user's selection of the displayed at least one coupon offer to a user; storing the user's selection as at least one selected coupon offer; receiving an instruction from the user to recall the stored user selection; and generating a redemption code that represents the at least one selected coupon offer for redemption at a point-of-sale (POS) terminal

BRIEF DESCRIPTION OF THE DRAWINGS

Reference is now made to the following detailed description, taken in conjunction with the accompanying drawings. It is emphasized that various features may not be drawn to scale and the dimensions of various features may be arbitrarily increased or reduced for clarity of discussion. Further, some components may be omitted in certain figures for clarity of discussion.

Figure 1:
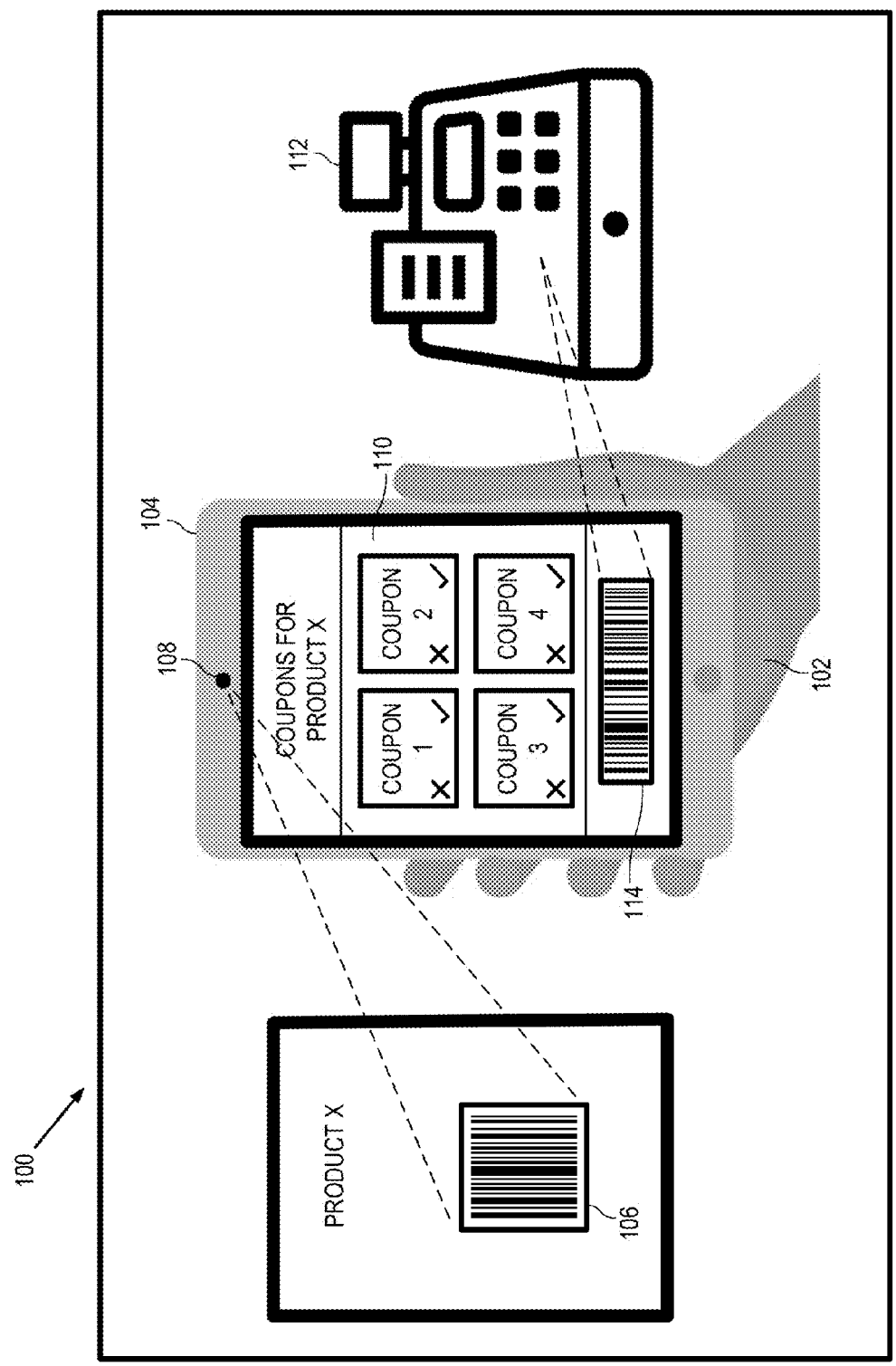
FIG. 1 shows an exemplary front-end shopping experience in accordance with some embodiments of the disclosure.

In the various figures, the same reference numbers are provided for the same system elements, whereas in other instances similar elements shown in different figures may have different reference numbers. The figures and associated description provide a plurality of different embodiments and similar elements among the figures will illustrate to one of ordinary skill in the art the possible functionality and connection of those elements in the multiple and collective embodiments disclosed herein.

DETAILED DESCRIPTION

Introduction

Embodiments of the present disclosure may be directed to the intelligent distribution, redemption, and tracking of coupons. The modernized couponing processes described herein may provide meaningful synergy between three different parties, namely the shopper, the retailer, and the product supplier.

For example, while shopping at a retailer, a shopper may use their mobile device to scan a barcode of a product that they wish to purchase. Based on the scanned barcode, relevant associated coupon offers are identified and electronically presented to the shopper on the user device. The shopper may then select one or more coupon offers to be redeemed at the point of sale.

Selected coupon offers may be added into a transaction-specific mobile "wallet" that provides the shopper with a summary of selected coupon offers. To streamline the coupon offer redemption process at the point of sale, multiple selected coupon offers may be consolidated into one "wallet" barcode for efficiency. All of the selected coupon offers may be redeemed by simply scanning the wallet barcode at the point of sale (as opposed to being required to scan each selected coupon offer individually).

Prior to executing the transaction at a point-of-sale terminal, the shopper may be required to provide identification information associated with the transaction. For example, the shopper may be required to provide or make accessible information that establishes their location to reduce fraudulent activity and provide assurances to the manufacturer that the redeemed offers were legitimately redeemed at an appropriate retailer. For example, the wallet barcode may not be generated or be otherwise made available to the user unless a location service (e.g., GPS or other positioning information) confirms that the user is located at the appropriate retailer. Identification information may also include an identification number associated with the point-of-sale terminal, an identification number associated an employee operating the point-of-sale terminal, an identification number associated with a retail store location at which the transaction is to be executed, and/or the like. This identification information may be used as security safeguard to authorize and monitor redemption of the wallet barcode (and thus the selected coupon offers) at the point of sale. In some embodiments, the identification information may be manually inputted by the shopper and/or automatically collected by the shopper's mobile device using location services, camera services, and/or another input device as described herein.

After being scanned at the point-of-sale terminal, redeemed coupon offers may be tracked throughout the clearing process by the retailer. In this manner, nightly balancing of the till of the point-of-sale terminal with respect to transactions involving redeemed coupons may become increasingly accurate. The retailer may also monitor cashier performance at the point-of-sale terminal to improve productivity and reduce theft.

Digital invoices associated with coupon redemptions may be automatically generated and forwarded to the product supplier, thereby ensuring quick and accurate settlement. By tracking redemptions of coupon offers based on a product category, store location, and/or time of year, the product supplier may create targeted coupon campaigns that are more relevant to the shopper.

Illustrative Example

Referring now to the figures, FIG. 1 illustrates an exemplary front-end shopping experience 100 using the systems and methods described herein. While shopping at a retail location, a user 102 may utilize a user device 104 such as a smartphone to scan a product barcode 106. For example, the user 102 may capture an image of the product barcode 106 using a camera 108 of the user device 104.

Once scanned, the product barcode 106 may be utilized by the user device 104 to identify coupon offers 110 that are relevant to the product, the user 102, and/or the retail location. In some embodiments, the captured image of the product barcode 106 may be transmitted from the user device 104 to an enterprise server for identification of relevant coupon offers. The enterprise server may then transmit the relevant coupon offers 110 to the user device 104 for presentation to the user 102. The user 102 may use the user device 104 to select one or more of the presented coupon offers 110 for redemption at a point-of-sale terminal 112.

When the user 102 is ready to check out, the user device 104 may consolidate all selected coupon offers 110 into one newly-generated barcode 114. Scanning the newly-generated barcode 114 at the point-of-sale terminal 112 may redeem of multiple coupon offers 110 for multiple products. In this manner, only one barcode may be scanned at checkout as opposed to each coupon being scanned separately.

Information associated with the redeemed coupon offers 110 may be transmitted from the point-of-sale terminal 112 to the enterprise server for aggregation and analysis. The enterprise server may provide the user 102 (e.g., the shopper), a retailer associated with the point-of-sale terminal, and/or a product supplier with varying levels of access to this information. For example, the enterprise server may provide the user 102 with access to a shopping history that illustrates an amount of savings over time. The retailer may use the enterprise server to review pending and cleared redemptions of coupon offers, as well as to monitor till balance accuracy and employee performance relating to coupon offer redemption at the point-of-sale terminal. The enterprise server may also provide the product supplier with invoices for clearing redeemed coupons. Using information associated with purchasing habits supplied by the enterprise server, the product supplier may monitor product sales and create targeted coupon offers for future shoppers.

System Environment

Figure 2:
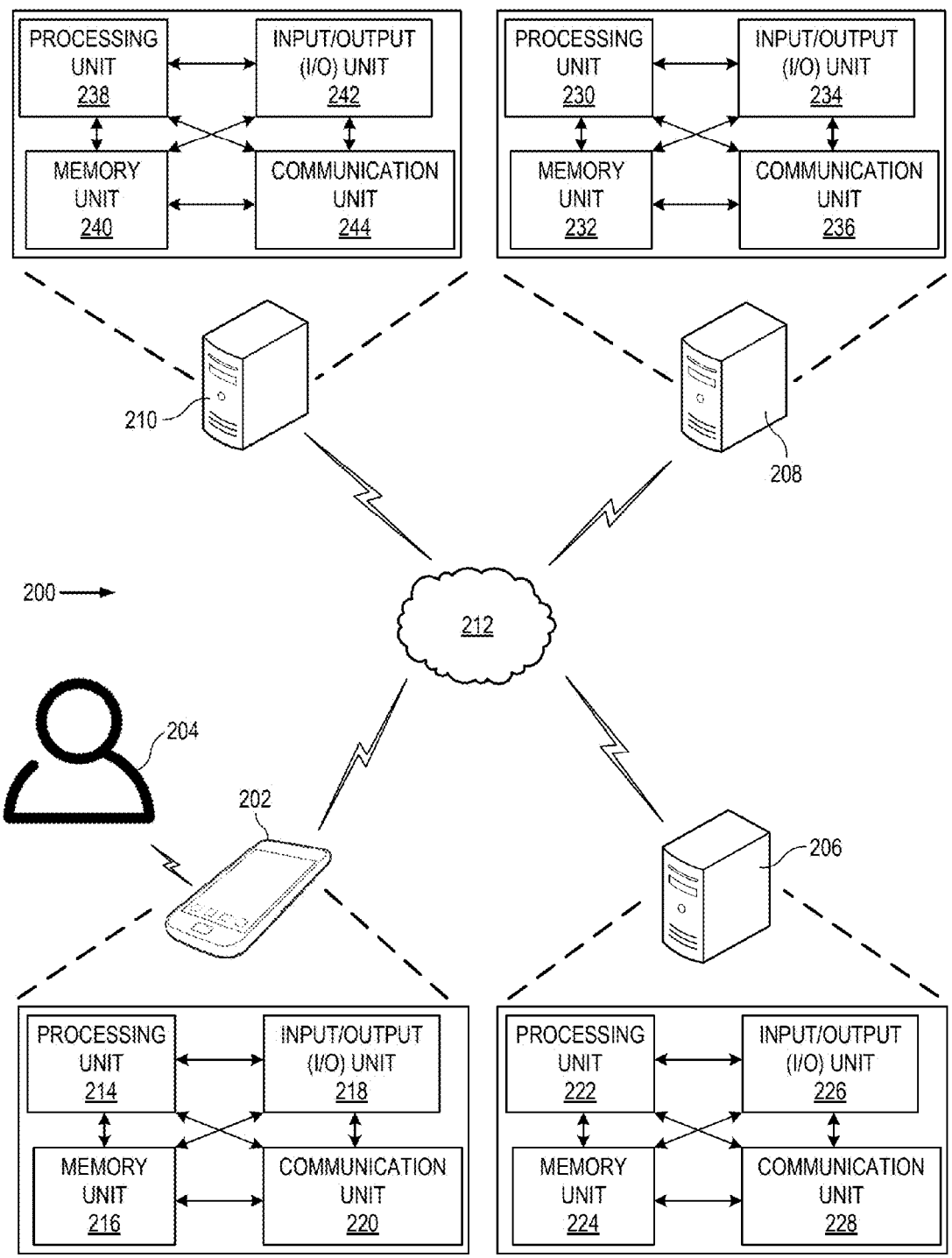
FIG. 2 shows an exemplary system diagram in accordance with some embodiments of the disclosure.

FIG. 2 illustrates a more detailed system 200 for the redemption of coupon offers as described herein (e.g., as described in the illustrative example of FIG. 1). In some embodiments, the system 200 may include a user device 202 of a user 204, a retailer server 206, a supplier server 208, and an enterprise server 210. Although one user device 202 and three servers 206, 208, 210 are illustrated in the presently described embodiment, the concepts disclosed here may be similarly applicable to an embodiment that includes more than one user device and different numbers of servers.

The user device 202, the retailer server 206, the supplier server 208, and the enterprise server 210 may be communicatively coupled to one another by a network 212 as described herein. In some embodiments, the network 212 may include a plurality of networks. In some embodiments, the network 212 may include any wireless and/or wired communications network that facilitates communication between the user device 202, the retailer server 206, the supplier server 208, and the enterprise server 210. For example, the one or more networks may include an Ethernet network, a cellular network, a computer network, the Internet, a wireless fidelity (Wi-Fi) network, a light fidelity (Li-Fi) network, a Bluetooth network, a radio frequency identification (RFID) network, a near-field communication (NFC) network, a laser-based network, and/or the like.

In some embodiments, the user device 202 may include a handheld computing device, a smart phone, a tablet, a laptop computer, a desktop computer, a personal digital assistant (PDA), a smart watch, a wearable device, a biometric device, an implanted device, a camera, a video recorder, an audio recorder, a touchscreen, a computer server, a virtual server, a virtual machine, and/or a video communications server. In some embodiments, the user device 202 may include a plurality of user devices configured to communicate with one another and/or implement load-balancing techniques described herein.

The user device 202 may include various elements of a computing environment as described herein (e.g., computing environment 300). For example, the user device 202 may include a processing unit 214, a memory unit 216, an input/output (I/O) unit 218, and/or a communication unit 220. Each of the processing unit 214, the memory unit 216, the input/output (I/O) unit 218, and/or the communication unit 220 may include one or more subunits as described herein for performing operations associated with coupon redemption. The user 204 of the user device 202 may be a shopper.

In some embodiments, the retailer server 206 may include a computing device such as a mainframe server, a content server, a communication server, a laptop computer, a desktop computer, a handheld computing device, a smart phone, a smart watch, a wearable device, a touch screen, a biometric device, a video processing device, an audio processing device, a virtual machine, a cloud-based computing solution and/or service, a point-of-sale terminal, a product code scanner, and/or the like. The retailer server 206 may include a plurality of computing devices configured to communicate with one another and/or implement load-balancing techniques described herein.

In some embodiments, the retailer server 206 may include various elements of a computing environment as described herein (e.g., computing environment 300). For example, the retailer server 206 may include a processing unit 222, a memory unit 224, an input/output (I/O) unit 226, and/or a communication unit 228. Each of the processing unit 222, the memory unit 224, the input/output (I/O) unit 226, and/or the communication unit 228 may include one or more subunits and/or other computing instances as described herein for performing operations associated with coupon redemption. An employee of a retailer, the user 202 (e.g., a shopper), a clearinghouse employee, and/or a network administrator may operate the retail server 206.

In some embodiments, the supplier server 208 may include a computing device such as a mainframe server, a content server, a communication server, a laptop computer, a desktop computer, a handheld computing device, a smart phone, a smart watch, a wearable device, a touch screen, a biometric device, a video processing device, an audio processing device, a virtual machine, a cloud-based computing solution and/or service, and/or the like. The supplier server 208 may include a plurality of computing devices configured to communicate with one another and/or implement load-balancing techniques described herein.

In some embodiments, the supplier server 208 may include various elements of a computing environment as described herein (e.g., computing environment 300). For example, the supplier server 208 may include a processing unit 230, a memory unit 232, an input/output (I/O) unit 234, and/or a communication unit 236. Each of the processing unit 230, the memory unit 232, the input/output (I/O) unit 234, and/or the communication unit 236 may include one or more subunits and/or other computing instances as described herein for performing operations associated with coupon redemption. An employee of a product supplier, a marketer, a coupon generator, a clearinghouse employee, and/or a network administrator may operate the supplier server 208.

In some embodiments, the enterprise server 210 may include a computing device such as a mainframe server, a content server, a communication server, a laptop computer, a desktop computer, a handheld computing device, a smart phone, a smart watch, a wearable device, a touch screen, a biometric device, a video processing device, an audio processing device, a virtual machine, a cloud-based computing solution and/or service, and/or the like. The enterprise server 210 may include a plurality of computing devices configured to communicate with one another and/or implement load-balancing techniques described herein.

In some embodiments, the enterprise server 210 may include various elements of a computing environment as described herein (e.g., computing environment 300). For example, the enterprise server 210 may include a processing unit 238, a memory unit 240, an input/output (I/O) unit 242, and/or a communication unit 244. Each of the processing unit 238, the memory unit 240, the input/output (I/O) unit 242, and/or the communication unit 244 may include one or more subunits and/or other computing instances as described herein for performing operations associated with coupon redemption. An employee of a clearinghouse enterprise, a marketer, a coupon provider, an employee of a coupon redemption enterprise, and/or a network administrator may operate the enterprise server 210.

Computing Architecture

Figure 3A:
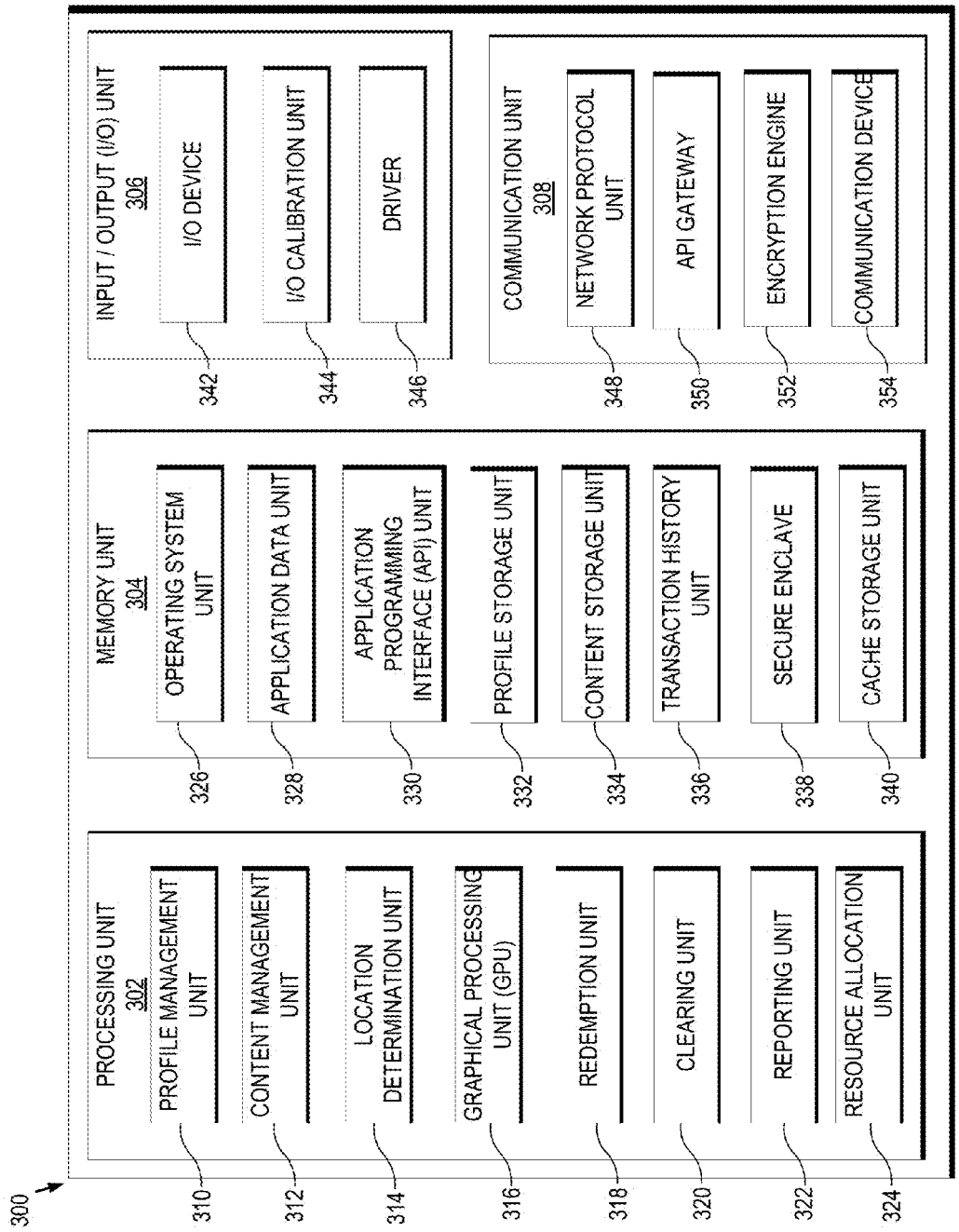
FIG. 3A shows an exemplary functional diagram in accordance with some embodiments of the disclosure.
Figure 3B:
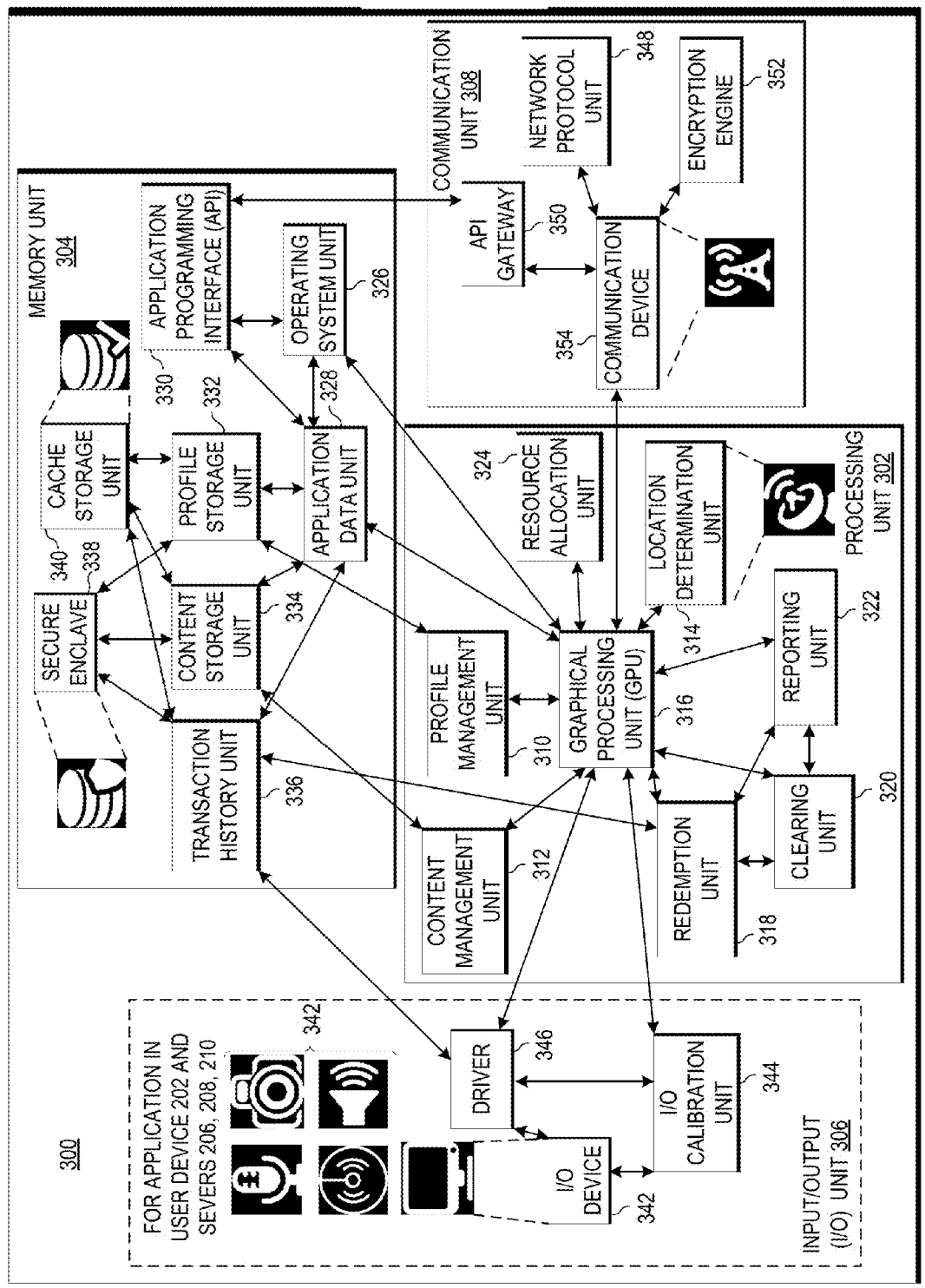
FIG. 3B shows an exemplary system diagram in accordance with some embodiments of the disclosure.

FIG. 3A and FIG. 3B illustrate exemplary functional and system diagrams of a computing environment 300 for coupon redemption processes described herein. Specifically, FIG. 3A provides a functional block diagram of the computing environment 300, whereas FIG. 3B provides a detailed system diagram of the computing environment 300.

As seen in FIG. 3A and FIG. 3B, the computing environment 300 may include a processing unit 302, a memory unit 304, an I/O unit 306, and a communication unit 308. Each of the processing unit 302, the memory unit 304, the I/O unit 306, and the communication unit 308 may include one or more subunits for performing operations associated with coupon redemption as described herein. Further, each unit and/or subunit of the computing environment 300 may be operatively and/or otherwise communicatively coupled with each other so as to facilitate the coupon redemption techniques described herein. The computing environment 300 including any of its units and/or subunits may include general hardware, specifically-purposed hardware, and/or software.

Importantly, the computing environment 300 of FIG. 3A and/or FIG. 3B may be included in one or more of the user device 202, the retailer server 206, the supplier server 208, and the enterprise server 210 of FIG. 2. Additionally, any units and/or subunits described herein with reference to the computing environment 300 of FIG. 3A and/or FIG. 3B may be included in one or more of the user device 202, the retailer server 206, the supplier server 208, and the enterprise server 210 of FIG. 2.

For example, the processing unit 302 of the computing environment 300 of FIG. 3A and/or FIG. 3B may be included in one or more of the processing units 214, 222, 230, 238 of FIG. 2. Similarly, the memory unit 304 of the computing environment 300 of FIG. 3A and/or FIG. 3B may be included in one or more of the memory units 216, 224, 232, 240 of FIG. 2. In some embodiments, the I/O unit 306 of the computing environment 300 of FIG. 3A and/or FIG. 3B may be included in one or more of the I/O units 218, 226, 234, 242 of FIG. 2. The communication unit 308 of the computing environment 300 of FIG. 3A and/or FIG. 3B may also be included in one or more of the communication units 220, 228, 236, 244 of FIG. 2.

The processing unit 302 may control one or more of the memory unit 304, the I/O unit 306, and the communication unit 308 of the computing environment 300, as well as any included subunits, elements, components, devices, and/or functions performed by the memory unit 304, the I/O unit 306, and the communication unit 308. The described sub-elements of the computing environment may also be included in similar fashion in any of the other units and/or devices included in the system 200 of FIG. 2. Additionally, any actions described herein as being performed by a processor may be taken by the processing unit 302 of FIG. 3A and/or FIG. 3B alone and/or by the processing unit 302 in conjunction with one or more additional processors, units, subunits, elements, components, devices, and/or the like. Additionally, while one processing unit 302 may be shown in FIG. 3A and/or FIG. 3B, multiple processing units may be present and/or otherwise included in the computing environment 300 or elsewhere in the overall system (e.g., system 200 of FIG. 2). Thus, while instructions may be described as being executed by the processing unit 302 (and/or various subunits of the processing unit 302), the instructions may be executed simultaneously, serially, and/or otherwise by one or multiple processing units 302 on one or more devices.

In some embodiments, the processing unit 302 may be implemented as one or more computer processing unit (CPU) chips and/or graphical processing unit (GPU) chips and may include a hardware device capable of executing computer instructions. The processing unit 302 may execute instructions, codes, computer programs, and/or scripts. The instructions, codes, computer programs, and/or scripts may be received from and/or stored in the memory unit 304, the I/O unit 306, the communication unit 308, subunits and/or elements of the aforementioned units, other devices and/or computing environments, and/or the like.

In some embodiments, the processing unit 302 may include, among other elements, subunits such as a profile management unit 310, a content management unit 312, a location determination unit 314, a graphical processing unit (GPU) 316, a redemption unit 318, a clearing unit 320, a reporting unit 322, and/or a resource allocation unit 324. Each of the aforementioned subunits of the processing unit 302 may be communicatively and/or otherwise operably coupled with each other.

The profile management unit 310 may facilitate generation, modification, analysis, transmission, and/or presentation of a user profile associated with a user (e.g., user 102 of FIG. 1 and/or user 204 of FIG. 2). For example, the profile management unit 310 may prompt a shopper to register by inputting authentication credentials, personal information (e.g., an age, a gender, and/or the like), contact information (e.g., a phone number, a zip code, a mailing address, an email address, a name, and/or the like), payment information (e.g., credit card information, bank account information, and/or the like), and/or the like. The user of the user device may take a picture of themselves or a product barcode through, for example, the profile management unit 310 that may control and/or utilize an element of the I/O unit 232. The profile management unit 310 may receive, process, analyze, organize, and/or otherwise transform any data received from the user and/or another computing element so as to generate a user profile of a user that includes personal information, contact information, payment information, user preferences, a photo, a video recording, an audio recording, a textual description, a virtual currency balance, a history of user activity, product barcode images, coupon redemption statistics, settings, and/or the like.

The content management unit 312 may facilitate generation, modification, analysis, transmission, and/or presentation of media content. For example, the content management unit 312 may control the audio-visual environment and/or appearance of application data during execution of various processes. Media content for which the content management unit 312 may be responsible may include coupon offers, product information, user interfaces, advertisements, images, text, themes, audio files, video files, documents, and/or the like. In some embodiments, the content management unit 312 may also interface with a third-party content server and/or memory location.

The location determination unit 314 may facilitate detection, generation, modification, analysis, transmission, and/or presentation of location information. Location information may include global positioning system (GPS) coordinates, an Internet protocol (IP) address, a media access control (MAC) address, geolocation information, an address, a port number, a zip code, a server number, a proxy name and/or number, device information (e.g., a serial number), a retailer location, a store number, a point-of-sale terminal identification number, and/or the like. In some embodiments, the location determination unit 314 may include various sensors, a radar, and/or other specifically-purposed hardware elements for the location determination unit 314 to acquire, measure, and/or otherwise transform location information.

The GPU unit 316 may facilitate generation, modification, analysis, processing, transmission, and/or presentation of media content described above, coupon redemption information, purchase information, and/or the like. In some embodiments, the GPU unit 316 may be utilized to render media content for presentation on a computing device (e.g., a shopper's smart phone, a retailer or supplier terminal, and/or the like). The GPU unit 316 may also be utilized for capturing an image of a product barcode in conjunction with the I/O unit 306, presenting user interfaces to users, receiving user selections and actions via the presented user interfaces, and/or the like. The GPU unit 316 may also include multiple GPUs and therefore may be configured to perform and/or execute multiple processes in parallel.

The redemption unit 318 may facilitate identification, analysis, and/or processing of coupon offers during coupon redemption processes described herein. For example, the redemption unit 318 may be utilized for generating coupon offers, identifying relevant coupon offers based on a captured image of a product barcode, generating a unique barcode in which to-be-redeemed coupon offers are comprised, processing coupon offers and payment information at a point-of-sale terminal, and/or the like. In some embodiments, the redemption unit 318 may include one or more GPUs and/or other processing elements so as to realize efficient redemption of coupon offers in either series or parallel.

The clearing unit 320 may facilitate analysis and/or processing of redeemed coupon offers. In some embodiments, the clearing unit 320 may generate invoices associated with coupon offers redeemed at one or more retailers and present the invoices to the supplier for settlement. The clearing unit 320 may calculate monetary amounts of scanned and/or redeemed coupon offers over predetermined periods of time (e.g., daily, weekly, monthly, and/or yearly) to provide accuracy of accounting of point-of-sale terminals.

The reporting unit 322 may facilitate analysis and/or processing of information associated with redeemed coupon offers. For example, the reporting unit 322 may track shopping histories, product sales, coupon offer scans, coupon offer redemptions, a status of a redeemed coupon offer during clearing processes, generate various reports, graphs, charts, and/or the like. The reporting unit 322 may provide users (e.g., a shopper, a retailer, a product supplier, and/or a network administrator) with access to information to monitor the redemption status and history of coupon offers, monitor the performance of employee performance at a point-of-sale terminal, monitor monetary savings, and/or the like.

The resource allocation unit 324 may facilitate the determination, monitoring, analysis, and/or allocation of computing resources throughout the computing environment 300 and/or other computing environments. For example, the computing environment may facilitate a high volume of (e.g., multiple) coupon offer redemptions between a large number of supported users (e.g., shoppers) and/or associated user devices, as well as simultaneous monitoring from multiple retailers and/or product suppliers. As such, computing resources of the computing environment 300 utilized by the processing unit 302, the memory unit 304, the I/O unit 306, and/or the communication unit 308 (and/or any subunit of the aforementioned units) such as processing power, data storage space, network bandwidth, and/or the like may be in high demand at various times during operation. Accordingly, the resource allocation unit 324 may be configured to manage the allocation of various computing resources as they are required by particular units and/or subunits of the computing environment 300 and/or other computing environments. In some embodiments, the resource allocation unit 324 may include sensors and/or other specially-purposed hardware for monitoring performance of each unit and/or subunit of the computing environment 300, as well as hardware for responding to the computing resource needs of each unit and/or subunit. In some embodiments, the resource allocation unit 324 may utilize computing resources of a second computing environment separate and distinct from the computing environment 300 to facilitate a desired operation.

For example, the resource allocation unit 324 may determine a number of simultaneous coupon offer redemptions and/or incoming requests for information associated with coupon redemptions. The resource allocation unit 324 may then determine that the number of simultaneous coupon offer redemptions and/or incoming requests for information associated with coupon redemptions meets and/or exceeds a predetermined threshold value. Based on this determination, the resource allocation unit 324 may determine an amount of additional computing resources (e.g., processing power, storage space of a particular non-transitory computer-readable memory medium, network bandwidth, and/or the like) required by the processing unit 302, the memory unit 304, the I/O unit 306, the communication unit 308, and/or any subunit of the aforementioned units for safe and efficient operation of the computing environment while supporting the number of simultaneous coupon offer redemptions and/or incoming requests for information associated with coupon redemptions. The resource allocation unit 324 may then retrieve, transmit, control, allocate, and/or otherwise distribute determined amount(s) of computing resources to each element (e.g., unit and/or subunit) of the computing environment 300 and/or another computing environment.

In some embodiments, factors affecting the allocation of computing resources by the resource allocation unit 324 may include the number of ongoing coupon offer redemptions and/or incoming requests for information associated with coupon redemptions, a duration of time during which computing resources are required by one or more elements of the computing environment 300, and/or the like. In some embodiments, computing resources may be allocated to and/or distributed amongst a plurality of second computing environments included in the computing environment 300 based on one or more factors mentioned above. In some embodiments, the allocation of computing resources of the resource allocation unit 324 may include the resource allocation unit 324 flipping a switch, adjusting processing power, adjusting memory size, partitioning a memory element, transmitting data, controlling one or more input and/or output devices, modifying various communication protocols, and/or the like. In some embodiments, the resource allocation unit 324 may facilitate utilization of parallel processing techniques such as dedicating a plurality of GPUs included in the processing unit 302 for processing a high-quality video stream of a video communication connection between multiple units and/or subunits of the computing environment 300 and/or other computing environments.

In some embodiments, the memory unit 304 may be utilized for storing, recalling, receiving, transmitting, and/or accessing various files and/or information during operation of the computing environment 300. For example, the memory unit 304 may be utilized for storing recalling, and/or updating user profile information, coupon offer redemption information, and/or the like. The memory unit 304 may include various types of data storage media such as solid state storage media, hard disk storage media, virtual storage media, and/or the like. The memory unit 302 may include dedicated hardware elements such as hard drives and/or servers, as well as software elements such as cloud-based storage drives. For example, the memory unit 304 may include various subunits such as an operating system unit 326, an application data unit 328, an application programming interface (API) unit 330, a profile storage unit 332, a content storage unit 334, a transaction history unit 336, a secure enclave 338, and/or a cache storage unit 340.

The memory unit 304 and/or any of its subunits described herein may include random access memory (RAM), read only memory (ROM), and/or various forms of secondary storage. RAM may be used to store volatile data and/or to store instructions that may be executed by the processing unit 302. For example, the data stored may be a command, a current operating state of the computing environment 300, an intended operating state of the computing environment 300, and/or the like. As a further example, data stored in the memory unit 304 may include instructions related to various methods and/or functionalities described herein. ROM may be a non-volatile memory device that may have a smaller memory capacity than the memory capacity of a secondary storage. ROM may be used to store instructions and/or data that may be read during execution of computer instructions. In some embodiments, access to both RAM and ROM may be faster than access to secondary storage. Secondary storage may be comprised of one or more disk drives and/or tape drives and may be used for non-volatile storage of data or as an over-flow data storage device if RAM is not large enough to hold all working data. Secondary storage may be used to store programs that may be loaded into RAM when such programs are selected for execution. In some embodiments, the memory unit 304 may include one or more databases for storing any data described herein. Additionally or alternatively, one or more secondary databases located remotely from the computing environment 300 may be utilized and/or accessed by the memory unit 304.

The operating system unit 326 may facilitate deployment, storage, access, execution, and/or utilization of an operating system utilized by the computing environment 300 and/or any other computing environment described herein. In some embodiments, the operating system unit 326 may include various hardware and/or software elements that serve as a structural framework for the processing unit 302 to execute various operations described herein. The operating system unit 326 may further store various pieces of information and/or data associated with operation of the operating system and/or the computing environment 300 as a whole, such as a status of computing resources (e.g., processing power, memory availability, resource utilization, and/or the like), runtime information, modules to direct execution of operations described herein, user permissions, security credentials, and/or the like.

The application data unit 328 may facilitate deployment, storage, access, execution, and/or utilization of an application utilized by the computing environment 300 and/or any other computing environment described herein. For example, a shopper may be required to download, access, and/or otherwise utilize a software application on a user device such as a smartphone to facilitate performance of coupon redemption operations described herein. As such, the application data unit 328 may store any information and/or data associated with the application. A user may use information included in the application data unit 328 to execute various coupon redemption operations via the user interfaces described herein, as well as other user interfaces. The application data unit 328 may further store various pieces of information and/or data associated with operation of the application and/or the computing environment 300 as a whole, such as a status of computing resources (e.g., processing power, memory availability, resource utilization, and/or the like), runtime information, user interfaces, modules to direct execution of operations described herein, user permissions, security credentials, and/or the like.

The API unit 330 may facilitate deployment, storage, access, execution, and/or utilization of information associated with APIs of the computing environment 300 and/or any other computing environment described herein. For example, the computing environment 300 may include one or more APIs for various devices, applications, units, subunits, elements, and/or other computing environments to communicate with each other and/or utilize the same data. Accordingly, the API unit 330 may include API databases containing information that may be accessed and/or utilized by applications, units, subunits, elements, and/or operating systems of other devices and/or computing environments. In some embodiments, each API database may be associated with a customized physical circuit included in the memory unit 304 and/or the API unit 330. Additionally, each API database may be public and/or private, and so authentication credentials may be required to access information in an API database.

The profile storage unit 332 may facilitate deployment, storage, access, and/or utilization of information associated with user profiles of users by the computing environment 300 and/or any other computing environment described herein. For example, the profile storage unit 332 may store contact information, payment information, authentication credentials, user preferences, a user history of behavior, personal information, location information, retailer information, supplier information, and/or metadata of a shopper, a retailer, and/or a product supplier. In some embodiments, the profile storage unit 332 may communicate with the profile management unit 310 to receive and/or transmit information associated with a user profile.

The content storage unit 334 may facilitate deployment, storage, access, and/or utilization of information associated with coupon offers by the computing environment 300 and/or any other computing environment described herein. For example, the content storage unit 334 may store one or more user interfaces, images, text, videos, audio content, coupon offers, information associated with a coupon offer, advertisements, and/or metadata to be presented to a user during operations described herein. In some embodiments, the content storage unit 334 may communicate with the content management unit 312 to receive and/or transmit content files (e.g., media content).

The transaction history unit 336 may facilitate deployment, storage, access, analysis, and/or utilization of coupon redemption information by the computing environment 300 and/or any other computing environment described herein. For example, the transaction history unit 336 may store information associated with each transaction that involves coupon offer redemptions. The information stored in the transaction history unit 336 may be utilized by the profile management unit 310, the content management unit 312, the GPU unit 316, the redemption unit 318, the clearing unit 320, and/or the reporting unit 322 to perform various coupon redemption operations described herein. In some embodiments, information associated with coupon redemptions may include a coupon offer amount or discount, a number of coupon offer redemptions, a time and date of redemption, a point-of-sale terminal identification number, an employee identification number, a location associated with the point-of-sale terminal, a purchase price, an coupon offer expiration date, a deadline for clearing a coupon offer redemption, a product barcode, a coupon offer barcode, a uniquely-generated barcode of multiple coupon offers that are to be redeemed in a transaction, user profile information, payment information, contact information, audio, images, text, video, and/or any other media content.

The secure enclave 338 may facilitate secure storage of data. In some embodiments, the secure enclave 338 may include a partitioned portion of storage media included in the memory unit 304 that is protected by various security measures. For example, the secure enclave 338 may be hardware secured. In other embodiments, the secure enclave 338 may include one or more firewalls, encryption mechanisms, and/or other security-based protocols. Authentication credentials of a user may be required prior to providing the user access to data stored within the secure enclave 338.

The cache storage unit 340 may facilitate short-term deployment, storage, access, analysis, and/or utilization of data. For example, the cache storage unit 240 may be utilized for storing unique barcodes generated for a transaction. In some embodiments, the cache storage unit 340 may serve as a short-term storage location for data so that the data stored in the cache storage unit 340 may be accessed quickly. In some embodiments, the cache storage unit 340 may include RAM and/or other storage media types for quick recall of stored data. The cache storage unit 340 may included a partitioned portion of storage media included in the memory unit 304.

The I/O unit 306 may include hardware and/or software elements for the computing environment 300 to receive, transmit, and/or present information useful for performing coupon redemption operations as described herein. For example, elements of the I/O unit 306 may be used to receive user input from a user via a user device, capture images of product barcodes, capture barcodes at a point-of-sale terminal, present user interfaces and display information to users, and/or the like. In this manner, the computing environment 300 may use the I/O unit 306 to interface with a human (or nonhuman) user. As described herein, the I/O unit 306 may include subunits such as an I/O device 342, an I/O calibration unit 344, and/or video driver 346.

The I/O device 342 may facilitate the receipt, transmission, processing, presentation, display, input, and/or output of information as a result of executed processes described herein. In some embodiments, the I/O device 342 may include a plurality of I/O devices. In some embodiments, the I/O device 342 may include one or more elements of a user device, a computing system, a server, a point-of-sale terminal, and/or a similar device. As such, the I/O device 342 may include a variety of elements for a user to interface with the computing environment 300. For example, the I/O device 342 may include a keyboard, a touchscreen, a button, a sensor, a biometric scanner, a laser, a microphone, a camera, a barcode scanner, a cash register, a point-of-sale terminal, and/or another element for receiving and/or collecting input from a user. Additionally and/or alternatively, the I/O device 342 may include a display, a screen, a sensor, a vibration mechanism, a light emitting diode (LED), a speaker, a radio frequency identification (RFID) scanner, a barcode scanner, a cash register, a point-of-sale terminal, and/or another element for presenting and/or otherwise outputting data to a user. In some embodiments, the I/O device 342 may communicate with one or more elements of the processing unit 302 and/or the memory unit 204 to execute operations associated with coupon redemption as described herein. For example, the I/O device 342 may include a camera on a shopper's user device that utilizes a GPU 316 to capture an image of a product barcode while shopping. Similarly, the I/O device 342 may include a barcode scanner at a point-of-sale terminal that is used to scan a barcode when the shopper wishes to redeem coupon offers during a purchase transaction.

The I/O calibration unit 344 may facilitate the calibration of the I/O device 342. For example, the I/O calibration unit 344 may detect and/or determine one or more settings of the I/O device 342, and then adjust and/or modify settings so that the I/O device 342 may operate more efficiently.

In some embodiments, the I/O calibration unit 344 may utilize a driver 346 (or multiple drivers) to calibrate the I/O device 342. For example, the driver 346 may include software that is to be installed by the I/O calibration unit 344 so that an element of the computing environment 300 (or an element of another computing environment) may recognize and/or integrate with the I/O device 342 for the coupon redemption processes described herein.

The communication unit 308 may facilitate establishment, maintenance, monitoring, and/or termination of communications between the computing environment 300 and other computing environments, third party server systems, and/or the like. The communication unit 234 may facilitate communication between various elements (e.g., units and/or subunits) of the computing environment 300. In some embodiments, the communication unit 234 may include a network protocol unit 348, an API gateway 350, an encryption engine 352, and/or a communication device 354. The communication unit 234 may include hardware and/or software elements.

The network protocol unit 348 may facilitate establishment, maintenance, and/or termination of a communication connection for the computing environment 300 by way of a network. For example, the network protocol unit 348 may detect and/or define a communication protocol required by a particular network and/or network type. Communication protocols utilized by the network protocol unit 348 may include Wi-Fi protocols, Li-Fi protocols, cellular data network protocols, Bluetooth® protocols, WiMAX protocols, Ethernet protocols, powerline communication (PLC) protocols, and/or the like. In some embodiments, facilitation of communication for the computing environment 300 may include transforming and/or translating data from being compatible with a first communication protocol to being compatible with a second communication protocol. In some embodiments, the network protocol unit 348 may determine and/or monitor an amount of data traffic to consequently determine which particular network protocol is to be used for establishing a secure communication connection, transmitting data, and/or performing coupon redemption operations as described herein.

The API gateway 350 may facilitate other devices and/or computing environments to access the API unit 330 of the memory unit 304 of the computing environment 300. For example, a user device (e.g., user device 104 of FIG. 1 and/or user device 202 of FIG. 2) may access the API unit 330 of the computing environment 300 via the API gateway 350. In some embodiments, the API gateway 350 may be required to validate user credentials associated with a user of a user device prior to providing access to the API unit 330 to a user. The API gateway 350 may include instructions for the computing environment 300 to communicate with another device and/or between elements of the computing environment 300.

The encryption engine 352 may facilitate translation, encryption, encoding, decryption, and/or decoding of information received, transmitted, and/or stored by the computing environment 300. Using the encryption engine, each transmission of data may be encrypted, encoded, and/or translated for security reasons, and any received data may be encrypted, encoded, and/or translated prior to its processing and/or storage. In some embodiments, the encryption engine 352 may generate an encryption key, an encoding key, a translation key, and/or the like, which may be transmitted along with any data content.

The communication device 354 may include a variety of hardware and/or software specifically purposed to communication for the computing environment 300. In some embodiments, the communication device 354 may include one or more radio transceivers, chips, analog front end (AFE) units, antennas, processing units, memory, other logic, and/or other components to implement communication protocols (wired or wireless) and related functionality for facilitating communication for the computing environment 300. Additionally and/or alternatively, the communication device 354 may include a modem, a modem bank, an Ethernet device such as a router or switch, a universal serial bus (USB) interface device, a serial interface, a token ring device, a fiber distributed data interface (FDDI) device, a wireless local area network (WLAN) device and/or device component, a radio transceiver device such as code division multiple access (CDMA) device, a global system for mobile communications (GSM) radio transceiver device, a universal mobile telecommunications system (UMTS) radio transceiver device, a long term evolution (LTE) radio transceiver device, a worldwide interoperability for microwave access (WiMAX) device, and/or another device used for communication purposes.

The Supplier

In some embodiments, the supplier may utilize one or more elements of the supplier server 208 of the system 200 of FIG. 2 to generate targeted coupon offers that may be ultimately redeemed by shoppers at various retail locations, as well as to track the clearing of coupon offer redemptions. To begin operation of embodiments described herein, the supplier may download and/or install an application associated with coupon redemption operations described herein on the supplier server 208. It will be appreciated that it is not always necessary to download or install an application and the application may be provided by a web service, a cloud service, or other software as a service approaches. For example, the supplier may download the application from an application store or a library of applications that are available for download via an online network, install the application using a compact disk or flash drive, and/or the like. In some embodiments, downloading and/or installing the application may include receiving application data from the enterprise server 210.

Upon download and installation of the application on the supplier server 208, the supplier may select and open the application. The application may then prompt the supplier to register and create a user profile (e.g., a supplier profile). The supplier may input authentication credentials such as a username and password, an email address, contact information, personal information, user preferences, product catalog information, and/or other information as part of the supplier registration process. Once inputted, this user profile information may be transmitted to the enterprise server 210 for processing and/or storage.

Figure 4:
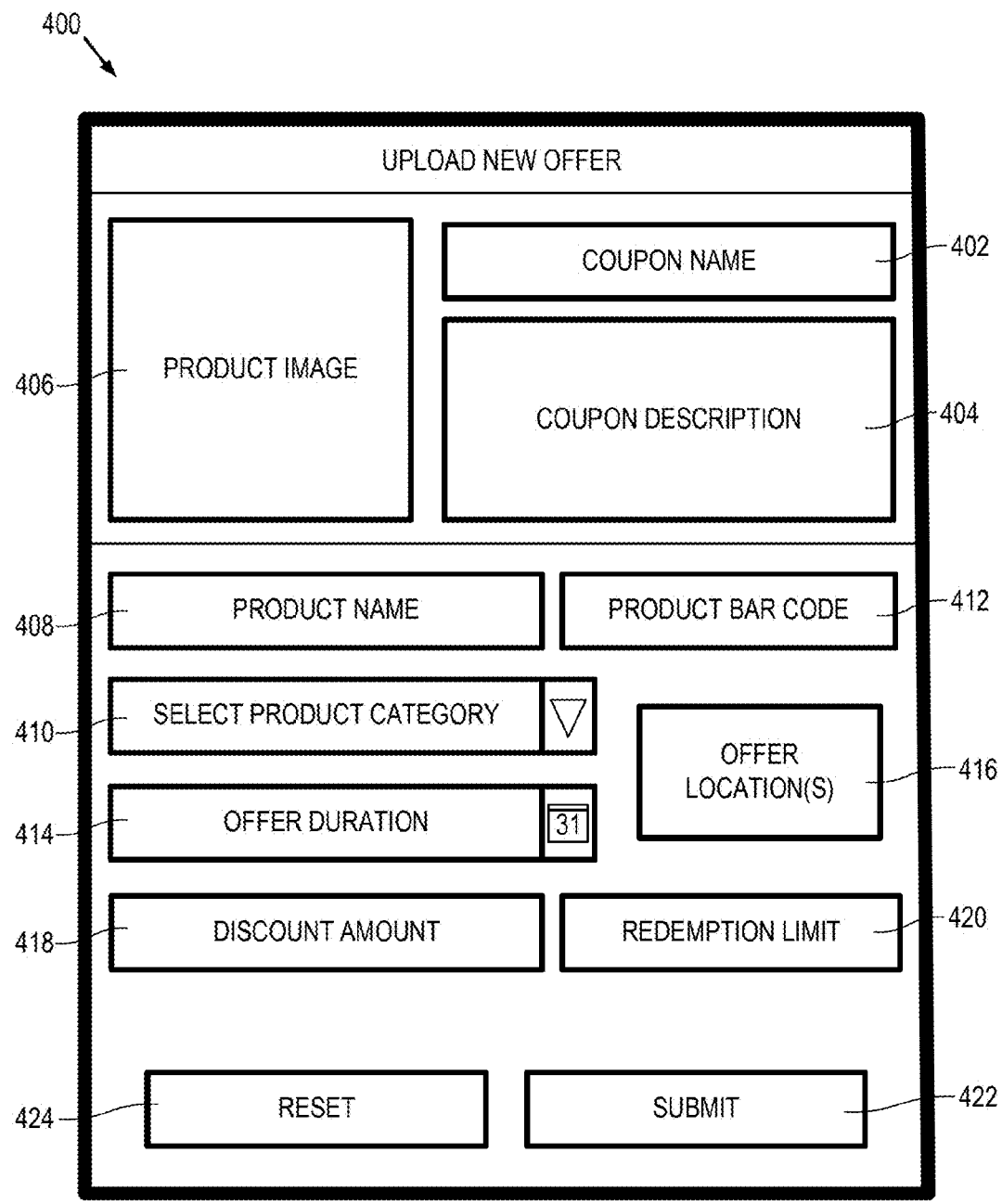
FIG. 4 shows an exemplary user interface for a product supplier to create a new coupon offer in accordance with some embodiments of the disclosure.

Now with reference to FIG. 4, an exemplary user interface 400 may be used by a product supplier (hereinafter "supplier") to upload a new coupon offer. The supplier may be prompted by the user interface 400 to input information associated with the coupon offer. For example, the supplier may input a coupon name 402, a description of the coupon 404, and/or upload a product image 406 of a product associated with the coupon offer. Additionally, the supplier may provide a product name 408, select a product category 410, and/or provide a product barcode 412. In some embodiments, the supplier may use a camera, barcode scanner, and/or other input device to capture an image of a product barcode 412. In other embodiments, the supplier may browse one or more memory locations responsible for storing product information to locate a saved image of a product barcode 412. In alternative embodiments, the product barcode 412 (and/or other pieces of information) may be automatically populated on the user interface 400 based on another piece of information being inputted or selected by the supplier.

The supplier may also specify an offer duration 414, including a time and date range during which the coupon offer is valid, as well as one or more offer locations 416 (e.g., retail locations, point-of-sale terminals, and/or the like) at which the coupon offer may be redeemed. In some embodiments, the coupon offer may be valid for different times at different retail locations or even different point-of-sale terminals. A discount amount 416 (e.g., a coupon amount, a total coupon campaign budget limit, and/or the like) as well as a total number of redemptions 418 may be specified for each retail location, retailer, point-of-sale terminal, time or date range, and/or based on other factors.

Once the supplier has provided sufficient information for creating the coupon offer, the coupon offer information may be submitted 420 (e.g., uploaded and/or transmitted) to the enterprise server 210. Alternatively, the supplier may reset 422 the user interface 400 to modify the coupon offer information. After the coupon offer has been successfully created by the supplier, the enterprise server 210 may make the coupon offer available to shoppers and/or retailers based on the information associated with the coupon offer.

Figure 5:
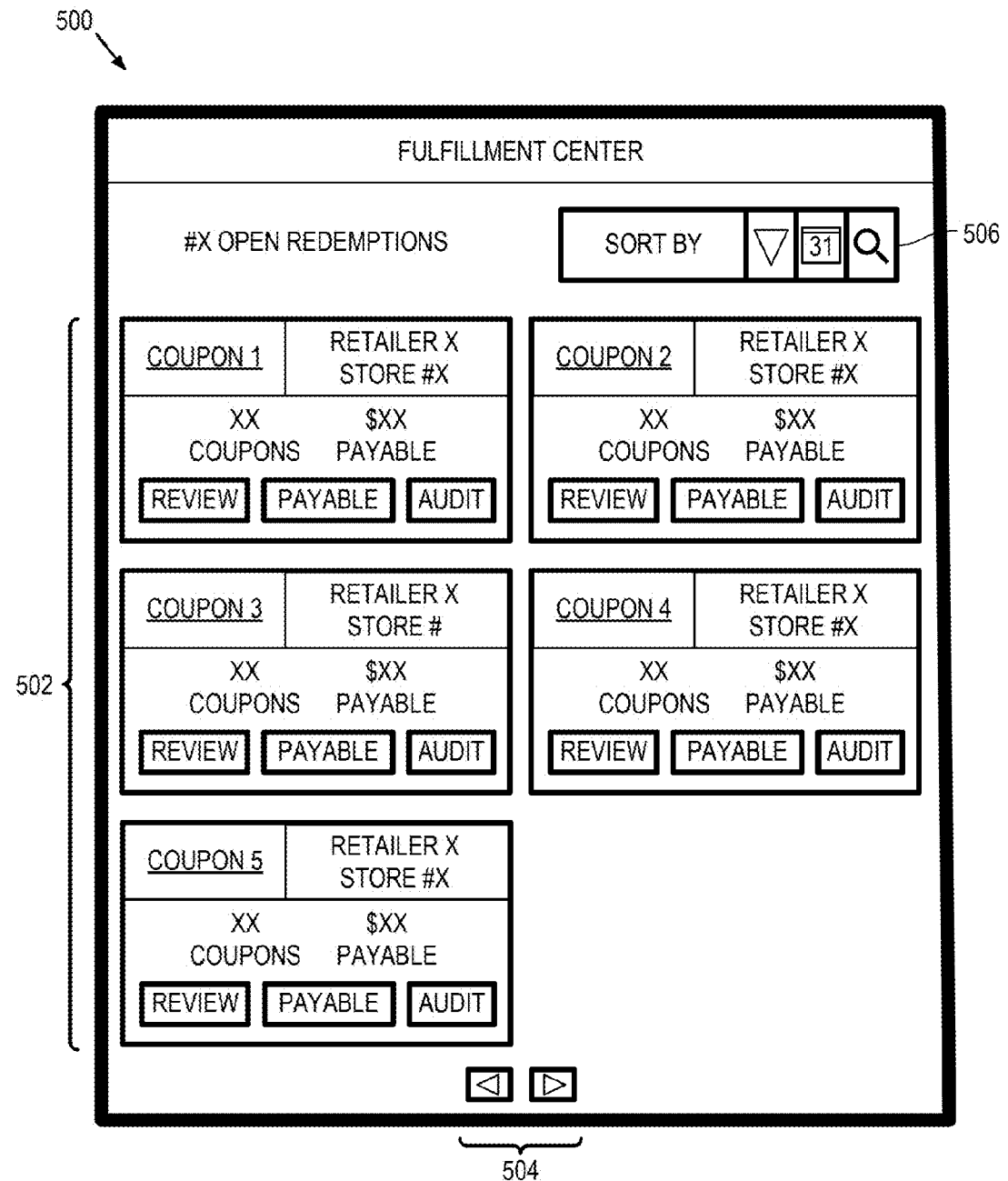
FIG. 5 shows an exemplary user interface for a product supplier to review open coupon redemptions in accordance with some embodiments of the disclosure.

As shown in FIG. 5, the supplier may use the user interface 500 to monitor the status of coupon offers 502 as they are redeemed by shoppers and/or processed by retailers. The supplier can browse 504 through the coupon offers 502, as well as sort 506 coupon offers based on a variety of factors such as a product, product category, a time or date range, and/or the like. Each redeemed coupon offer may be reviewed, paid, and/or audited by the supplier to provide accuracy of coupon offer clearing processes. In some embodiments, the supplier may receive invoices with calculated amounts to be paid for reimbursement of redeemed coupon offers. The supplier may use the user interface 500 to provide reimbursement to the retailer for redeemed coupons through the application and/or a third-party application associated with a financial institution or payment processor.

Figure 6:
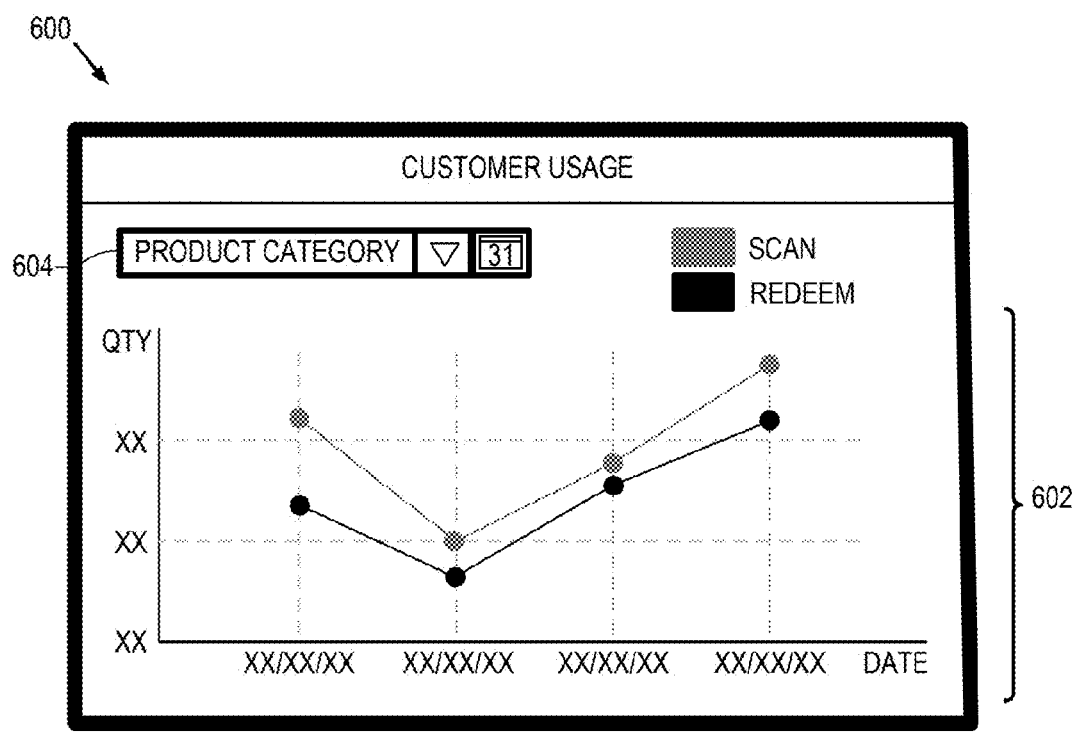
FIG. 6 shows an exemplary user interface for a product supplier to track coupon redemptions in accordance with some embodiments of the disclosure.

Additionally, the supplier may use the user interface 600 of FIG. 6 to review coupon offer redemptions. In some embodiments, a chart 602 (e.g., a graph and/or other infographic) may be produced that compares a number of scanned coupon offers to a number of redeemed coupon offers. The information included in the chart 602 may be sorted 604 based on product name, product category, as well as time or date range.

In other embodiments, various other reports that aid the supplier in understanding purchasing and coupon redemption behavior may be generated. For example, the supplier may be provided with recommendations for new targeted coupon offers based on aggregated coupon offer redemption information. If desired, information associated with recommended coupon offers may be automatically filled into a coupon offer upload interface (e.g., user interface 400) for efficiency.

As described above, information associated with coupon offer redemptions may be transmitted from the enterprise server 210 of FIG. 2 to the supplier server 208 for review, interaction, and/or manipulation. In some embodiments, the supplier may be provided with access to the information on the supplier server 208, but processing of the information may occur at the enterprise server 210. Alternatively, information may be processed locally by the supplier server 208 and transmitted to the enterprise server 210 at various intervals and/or in real time (e.g., continuously). Various pieces of information regarding settlement of coupon offer redemptions may also be transmitted from the supplier server 208 to a third party accounting firm for efficiency.

The Shopper

In some embodiments, the shopper may utilize one or more elements of the user device 202 of the system 200 of FIG. 2 to identify, select, and/or redeem coupon offers relevant to a product purchase. To begin operation of embodiments described herein, the shopper may download and/or install an application associated with coupon redemption operations described herein on the user device 202. For example, the user may download the application from an application store or a library of applications that are available for download via an online network, install the application using a compact disk or flash drive, and/or the like. It will be appreciated that it is not always necessary to download or install an application and the application may be provided by a web service, a cloud service, or other software as a service approaches. In some embodiments, downloading and/or installing the application may include receiving application data from the enterprise server 210.

Upon download and installation of the application on the user device 202, the shopper may select and open the application. The application may then prompt the shopper to register and create a user profile (e.g., a shopper profile). The shopper may input authentication credentials such as a username and password, an email address, contact information, personal information, user preferences, product catalog information, a social media account, and/or other information as part of the shopper registration process. Once inputted, this user profile information may be transmitted to the enterprise server 210 for processing and/or storage.

In some embodiments, registration of the shopper may include transmission of a text message (and/or another confirmation message type) requesting the shopper to confirm registration and/or the accuracy of the inputted information. For example, the enterprise server 210 may transmit the confirmation message to the user device 202. Once received, the shopper may confirm registration, and an acknowledgement may be transmitted from the user device 202 to the enterprise server 210, which ultimately receives the acknowledgement and generates the user profile based on the inputted information. Additionally, registration of the shopper may include providing the application with access to location and/or camera services of the user device 202. For example, the shopper may grant permission to the application to utilize the location services associated with the location determination unit 314 and/or services associated with the I/O device 342 of FIGS. 3A and 3B.

Figure 7:
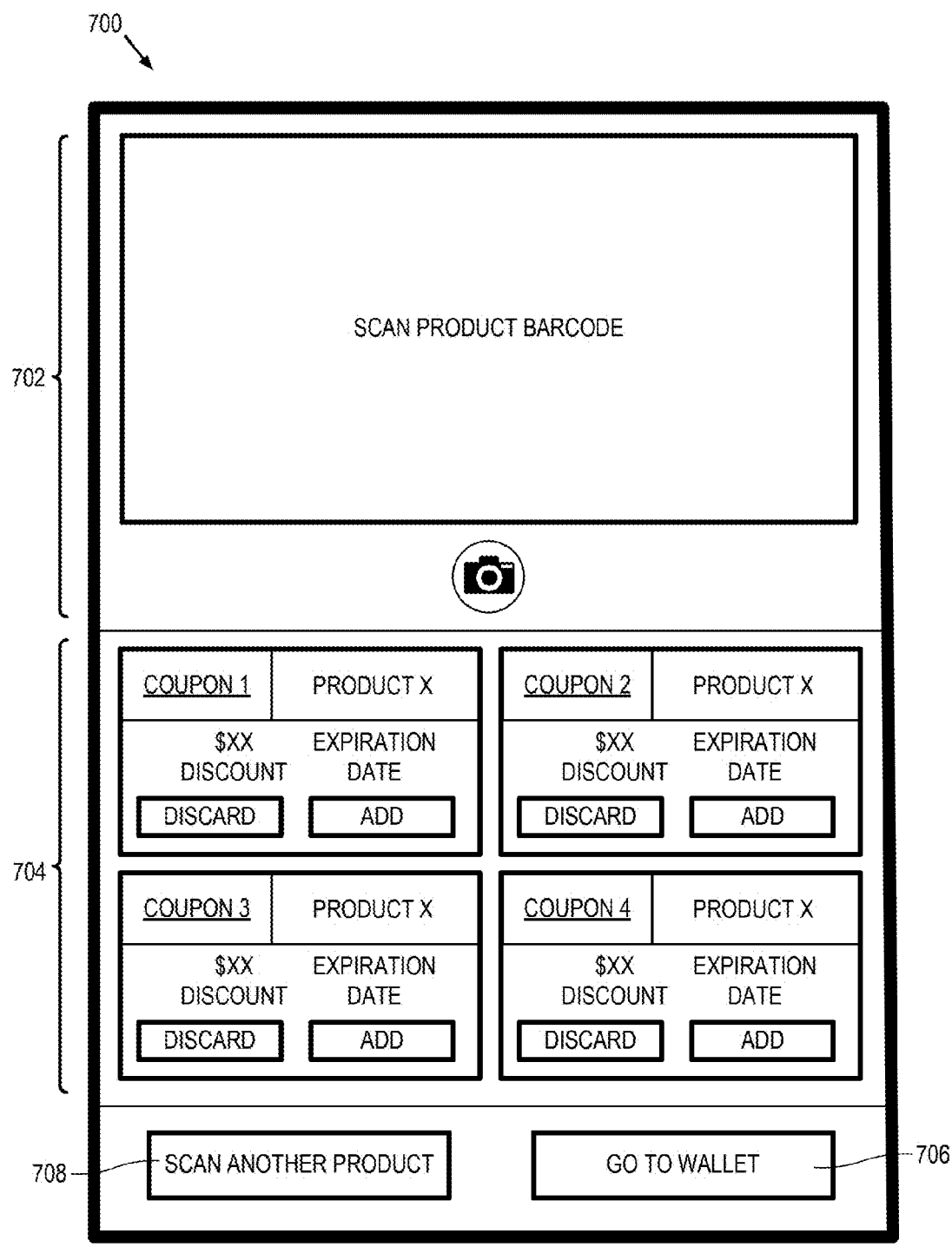
FIG. 7 shows an exemplary user interface for a shopper to identify coupon offers related to a product in accordance with some embodiments of the disclosure.

After registration is complete, the shopper may use the application while shopping at a retailer. For example, the shopper may be prompted by the user interface 700 of FIG. 7 to scan a product barcode 702. In some embodiments, the shopper may utilize a camera and/or another input device (e.g., an RFID reader, an NFC communication, a Bluetooth communication, and/or the like) to capture an image of a product barcode (e.g., a readable indicia, a universal product code (UPC), and/or another product identifier). In the event that a captured image of the scanned barcode is unrecognizable and/or otherwise unsuitable for identifying coupon offers associated with the product barcode, the user interface 700 may prompt the shopper to reattempt the image capture process or manually enter the data.

Once successfully captured, the image of the product barcode may be utilized to identify coupon offers 704 relevant to the product. In some embodiments, and with reference to FIG. 2, the image of the product barcode may be transmitted from the user device 202 to the enterprise server 210, which may then identify relevant coupon offers and/or any associated coupon offer information. Alternatively, relevant coupon offers and/or associated coupon offer information may be identified locally at the user device 202. Relevant coupon offers may be identified based on the image of the scanned product barcode, product information associated with the scanned product barcode, a location of the user device 202, a retail location, a time or date, and/or a combination of factors that may include personal data of the user to provide personalized coupon offers.

Referring back to FIG. 7, the user interface 700 presents the relevant coupon offers 704 to the shopper for the shopper to review as the shopper decides which coupon offers 704 they wish to redeem in a transaction. When the shopper wishes to redeem an identified coupon offer 704, they may add the identified coupon offer 704 to a wallet 706, which serves as an aggregation of all coupons to be redeemed in a transaction. The shopper may select a button, perform a gesture (e.g., a swipe, a hold, and/or the like) to select coupon offers via the user interface 700. The shopper may also use the user interface 700 to scan other barcodes of other products 708 so that multiple coupon offers for multiple products may be added to the wallet 708.

Figure 8:
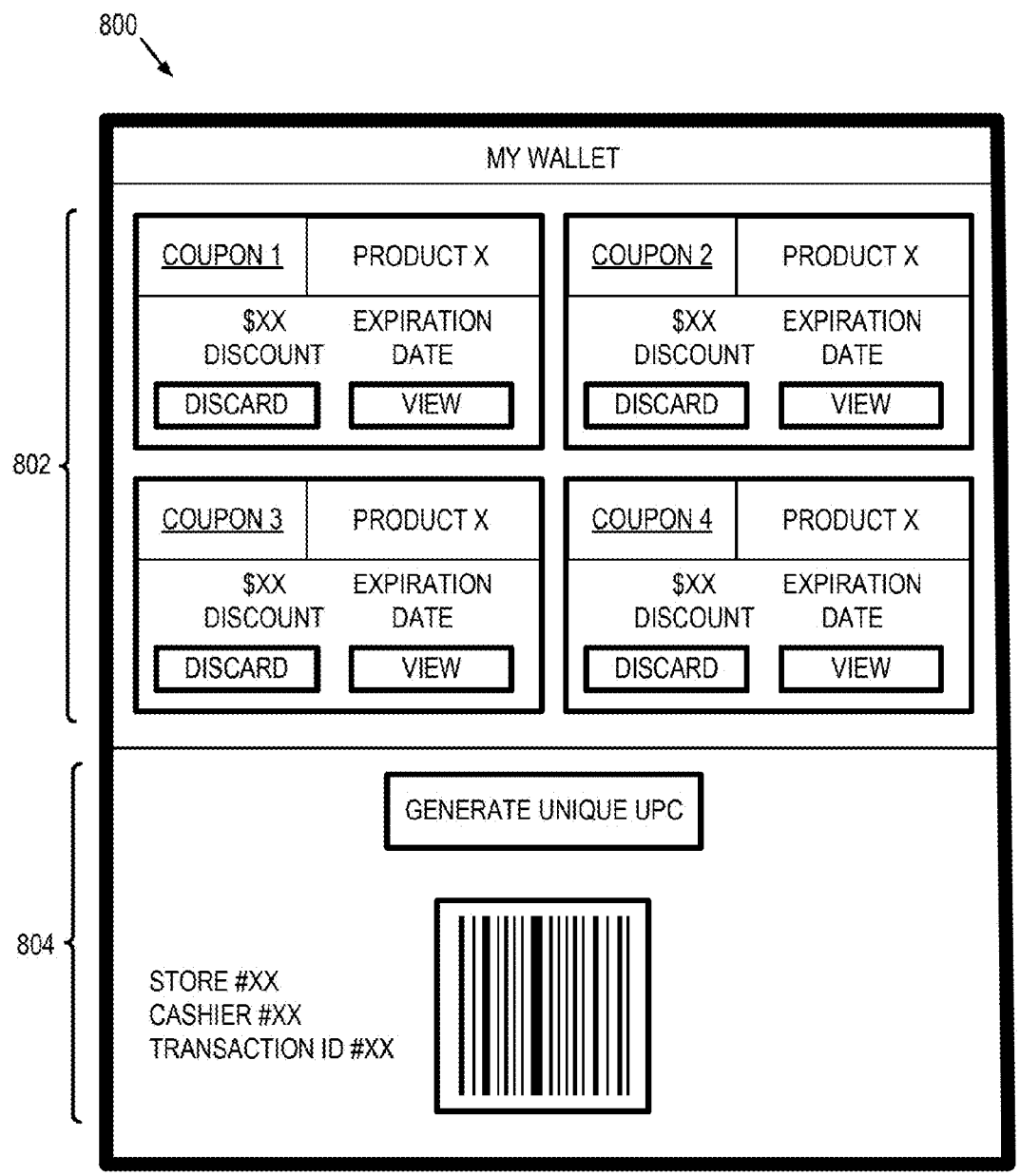
FIG. 8 shows an exemplary user interface for a shopper to redeem coupon offers using a unique UPC in accordance with some embodiments of the disclosure.

An exemplary user interface 800 of FIG. 8 illustrates the shopper's wallet (e.g., wallet 708) after coupon offers 802 have been selected for redemption. The shopper may use the user interface 800 to review which selected coupon offers 802 are to be redeemed in a transaction.

When the shopper is ready to check out and purchase the product(s) (and/or complete a transaction of another type), the user interface 800 may redeem the selected coupon offers 802 at a point-of-sale terminal of a retail location quickly and efficiently. The shopper may utilize the user interface 800 to generate a wallet barcode 804 that, when scanned at the point-of-sale terminal, redeems all selected coupon offers 802 in the shopper's wallet. The user interface 800 may then display the wallet barcode 804 so that the wallet barcode 804 may be scanned at a point-of-sale terminal for redemption of the selected coupon offers 802. In this manner, multiple coupon offers 802 may be redeemed by simply scanning one wallet barcode 804 as opposed to scanning multiple barcodes for multiple coupon offers.

In some embodiments, the generated wallet barcode 804 may include product information associated with each selected coupon offer 802 to be redeemed. The wallet barcode may also include information associated with the shopper, retailer, and/or supplier. For example, the wallet barcode may include a transaction number, a product identification number, a store identification number, a point-of-sale terminal identification number, an employee identification number associated with the point-of-sale terminal at which the transaction occurs, location information associated with the shopper and/or the retailer, and/or the like. This information may be collected and/or aggregated at the point-of-sale terminal from a variety of sources. For example, the user may select a point-of-sale terminal from a list of point-of-sale terminals determined to be within a predetermined proximity to the shopper.

Referring back to FIG. 2, the user device 202 may transmit selected coupon offers, as well as information associated with the shopper's wallet (e.g., transaction information, payment information, user information, and/or the like), to the enterprise server 210 for processing and/or generation of the wallet barcode. In the event that the enterprise server 210 generates the wallet barcode, the generated wallet barcode may be transmitted from the enterprise server 210 to the user device 202 for redemption at the point-of-sale terminal. The enterprise server 210 may also aggregate information associated with the transaction as described above from a variety of sources, including the user device 202, the retailer server 206, the supplier server 208, and/or the memory unit 240. This aggregated information may be included in the generated barcode and/or transmitted to the user device 202 in tandem with the wallet barcode. Additionally and/or alternatively, the user device 202 may process the selected coupon offers and/or generate the wallet barcode locally.

Figure 9:
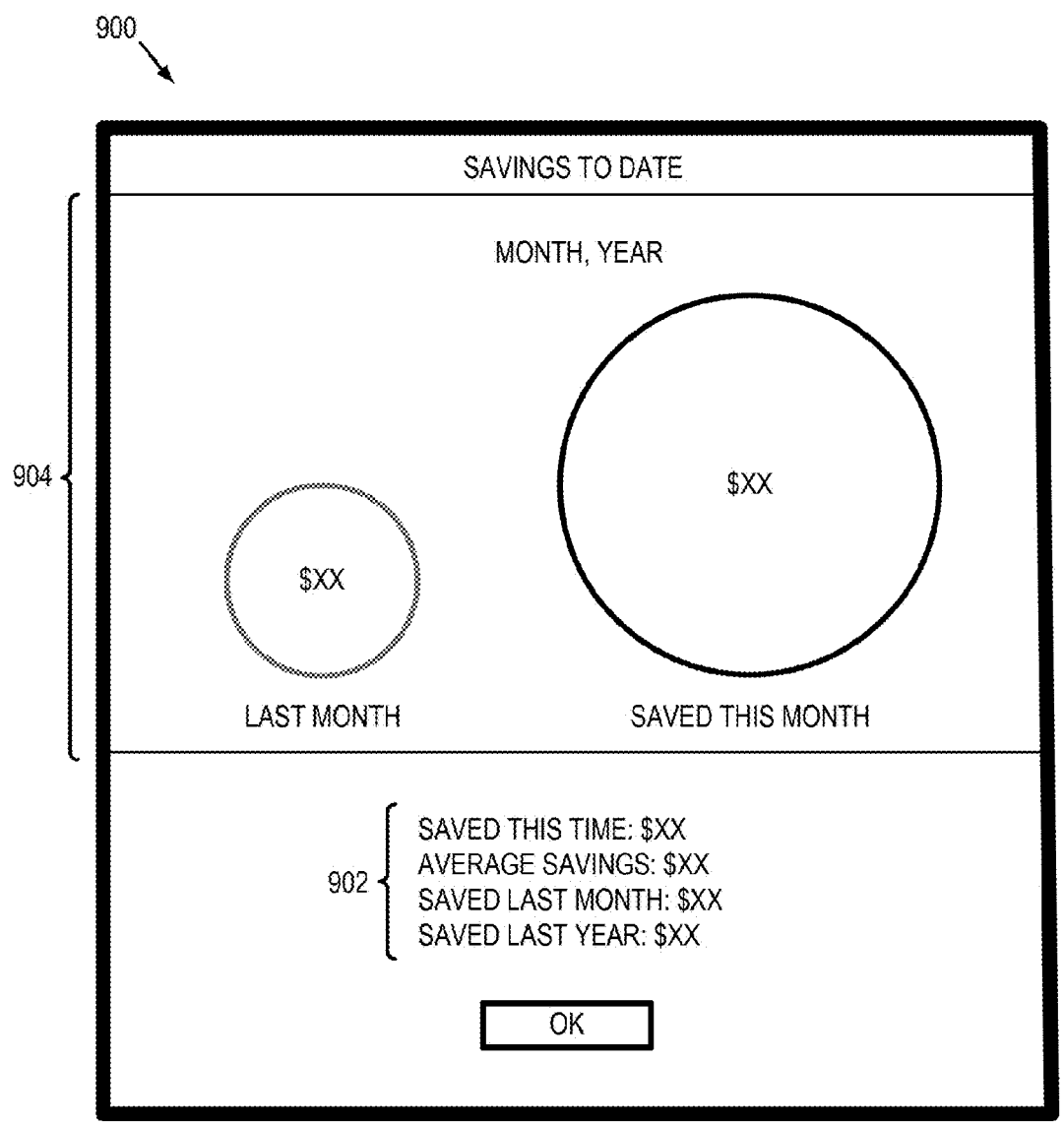
FIG. 9 shows an exemplary user interface for a shopper to track aggregated coupon savings in accordance with some embodiments of the disclosure.

After the wallet barcode is scanned at a point-of-sale terminal and the selected coupon offers have been redeemed by the shopper, the shopper may use the user interface 900 of FIG. 9 to review a summary of savings 902 associated with coupon offer redemptions. For example, the savings summary 902 may include an amount of savings of a most recent transaction, an average amount of savings per transaction, an amount saved over periods of time, and/or the like. The user may review a purchase history, information associated with the retailer and/or the supplier. Additionally, a graph 904 showing savings over a different periods of time may provide the shopper with visual representations of how value is added by utilizing the coupon redemption processes described herein.

The Retailer

In some embodiments, the retailer may utilize one or more elements of the retailer server 206 of the system 200 of FIG. 2 to redeem a shopper's coupon offers at a point-of-sale terminal, as well as to track the clearing of coupon offer redemptions. To begin operation of embodiments described herein, the retailer may download and/or install an application associated with coupon redemption operations described herein on the retailer server 206. It will be appreciated that it is not always necessary to download or install an application and the application may be provided by a web service, a cloud service, or other software as a service approaches. For example, the user may download the application from an application store or a library of applications that are available for download via an online network, install the application using a compact disk or flash drive, and/or the like. In some embodiments, downloading and/or installing the application may include receiving application data from the enterprise server 210.

Upon download and installation of the application on the retailer server 206, the supplier may select and open the application. The application may then prompt the supplier to register and create a user profile (e.g., a retailer profile). The retailer may input authentication credentials such as a username and password, an email address, contact information, personal information, user preferences, product catalog information, retail location information (e.g., a store identification number, a store location, point-of-sale terminal identification information, employee identification information, and/or the like), and/or other information as part of the retailer registration process. Once inputted, this user profile information may be transmitted to the enterprise server 210 for processing and/or storage.

Figure 10:
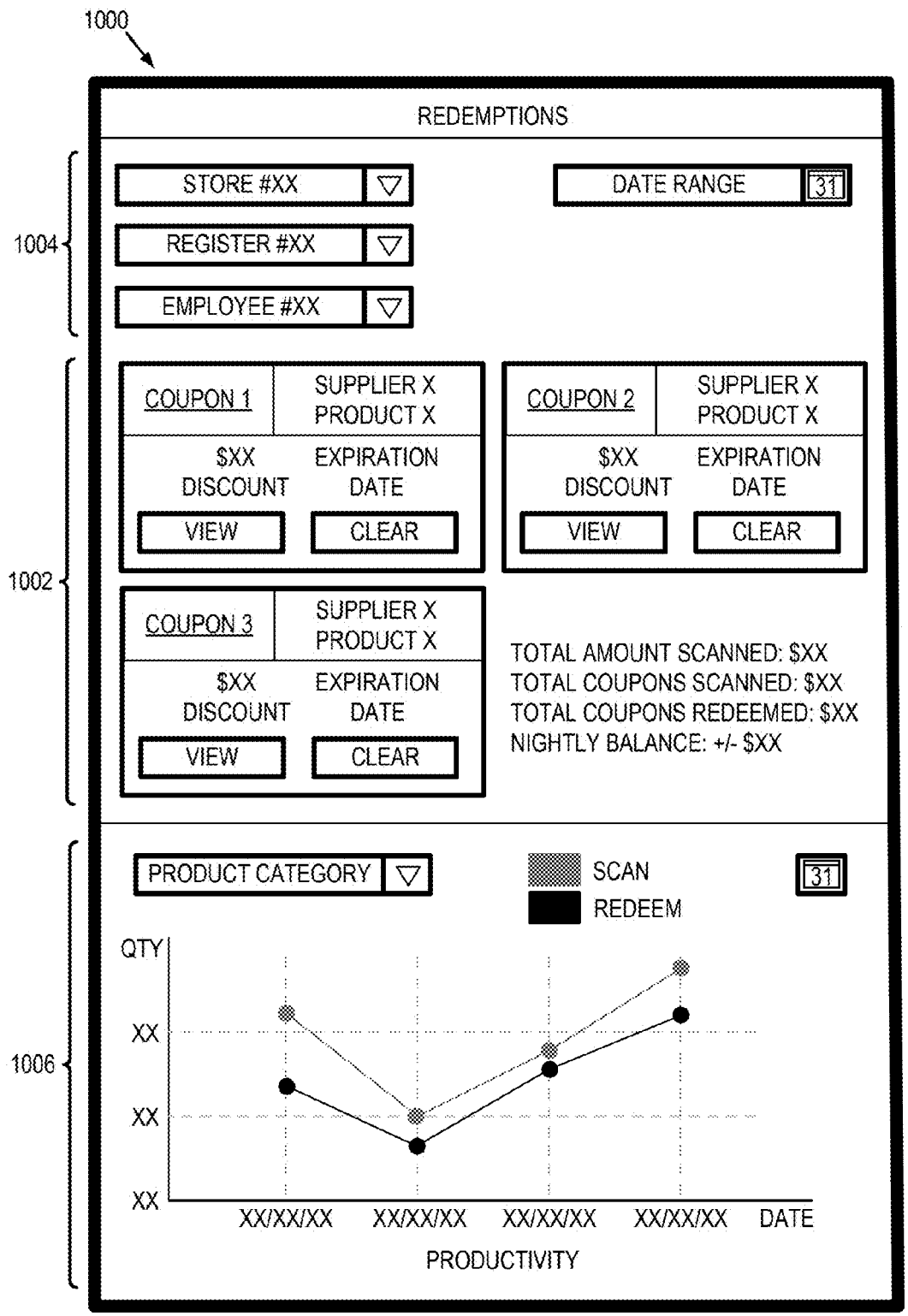
FIG. 10 shows an exemplary user interface for a retailer to review the redemption of coupon offers in accordance with some embodiments of the disclosure.

Now with reference to FIG. 10, a retailer may use an exemplary user interface 1000 to review coupon offer redemptions throughout the clearing process and provide accuracy of nightly accounting. For example, the retailer may view a summary of coupon offers 1002 redeemed by shoppers. The summary of coupon offers 1002 may include information associated with completed transactions (e.g., transaction amounts, discount amounts, time and date of transactions, and/or the like), as well as statistics associated with nightly accounting such as a total amount of products scanned, a total amount of coupon offers scanned, a total amount of coupon offers that have been redeemed and/or cleared with the supplier, a calculated balance, and/or the like.

The summary of coupon offers 1002 may be sorted 1004 by the retailer based on a store location, a store identification number, a point-of-sale terminal identification number, an employee identification number, a time or date range, and/or the like. Additionally, the user interface 1000 may provide a graph 1006 of coupon redemption performance, where the graph is sortable as described above. In this manner, the retailer may utilize the user interface 1000 to better understand purchasing and coupon redemption habits of shoppers, as well as to monitor a nightly accounting balance of the point-of-sale terminal. Similarly, the retailer may review employee performance at the point-of-sale terminal, thereby reducing the amount of employee fraud and/or theft.

The retailer may also use the user interface 1000 to review currently-pending coupon offers in each retail location associated with the retailer. The retailer may also release one or more coupon offer redemptions for clearing at periodic intervals following review and/or in real time (e.g., as a transaction is processed at a point-of-sale terminal).

Now with reference to FIG. 2, when the retailer checks out the shopper at a point-of-sale terminal associated with the retailer server 206 to purchase products and redeem coupon offers, the retailer may be required to provide a point-of-sale identification number and/or employee (e.g., retailer) identification number to the shopper. By providing an identification number associated with the point-of-sale terminal and/or employee of the retailer, the retailer can track the transaction (and thus the coupon offer redemptions associated with products involved in the transaction) using the system 200.

In some embodiments, the identification number may be provided by a retailer employee at the point-of-sale terminal to the shopper via the user device 202 and/or via an element of the retailer server 206. For example, the user device 202 may identify, using location-based techniques described herein, a point-of-sale terminal in closest proximity to the user device 202, and then identify an identification number associated with the nearest point-of-sale terminal. The shopper may also retrieve the identification number of the point-of-sale terminal and/or an employee by using the user device 202 to scan a barcode that includes the identification number. Alternatively, the shopper may input an identification number manually. Once received at the user device 202, the identification number may be transmitted from the user device 202 to the enterprise server 210 for processing, authentication, and/or storage. In other embodiments, the identification number may be transmitted from the point-of-sale terminal and/or another element of the retailer server 206 to the enterprise server 210 for processing, authentication, and/or storage.

After a transaction is completed, information associated with the transaction including coupon redemption information may be utilized by the retailer server 206 to balance the tills of the point-of-sale terminals with respect to coupon offer redemptions. Transaction and/or coupon redemption information may be also transmitted to a central retailer server 206 associated with the retailer for review and/or processing. For example, a national retail chain may have multiple store locations, and so retailer servers 206 local to "satellite" store locations may transmit transaction and/or coupon redemption information to a central retail server 208 for approval, review, processing, and/or clearing.

In some embodiments, transaction and/or coupon redemption information may be transmitted from the retailer server 206 to the enterprise server 210 for processing and/or storage. The enterprise server 210 may forward the transaction and/or coupon redemption information to the supplier server 208 for clearing of coupon offer redemptions. Additionally and/or alternatively, transaction and/or coupon redemption information may be transmitted directly from the retailer server 206 to the supplier server 208 for processing and/or clearing. The transaction and/or coupon redemption information may be transmitted from the retailer server 206 to various elements of the system 200 at periodic intervals and/or continuously (e.g., in real time).

The Enterprise Server

A network administrator associated with a coupon processing entity may control the enterprise server 210 of the system 200 of FIG. 2. In some embodiments, the coupon processing entity may be responsible for the efficient redemption of coupons as described herein. As such, the enterprise server 210 may serve as a central controller device for storing, processing, maintenance, analysis, and/or reporting of information utilized by the various elements of the system 200.

For example, the enterprise server 210 may store application data associated with the coupon redemption application(s) used by the user device 202, the retailer server 206, and/or the supplier server 208. The enterprise server 210 may transmit application data to one or more of the user device 202, the retailer server 206, and/or the supplier server 208 for download and/or installation purposes.

The enterprise server 210 may also maintain user profile databases for shoppers, retailers, and suppliers. Various pieces of information included in user profiles may be transmitted from the enterprise server 210 to one or more of the user device 202, the retailer server 206 and/or an associated point-of-sale terminal, the supplier server 208, and/or another device external to the system 200. This information may be utilized by elements of the system 200 for user authentication, coupon offer redemption, and/or other processes. The enterprise server 210 may also generate and/or distribute various user interfaces for facilitating coupon redemption operations described herein.

The enterprise server 210 may determine the location of one or more of the user device 202, the retailer server 206 and/or an associated point-of-sale terminal, and the supplier server 208 at various times during the coupon redemption process. For example, when a shopper wishes to check out at a point-of-sale terminal, the enterprise server 210 may identify locations of the shopper's user device 202 as well as store locations and/or point-of-sale terminals associated with the retailer server 206. Based on the identified locations, the enterprise server 210 may determine a nearby store location and/or point-of-sale terminal associated with the retailer server 206 so as to associate the transaction with accurate transaction identification information (e.g., a point-of-sale terminal identification number, an employee identification number, a store identification number, and/or the like).

The enterprise server 210 may further process images of product barcodes received from the user device 202 to identify coupon offers relevant to the product(s). In some embodiments, the enterprise server 210 may compare a received image of a product barcode with a plurality of product barcode images in a database of product information associated with pending coupon offers. In response to determining matches, the enterprise server 210 may identify one or more coupon offers that are relevant to the product barcode (and thus the product). Additionally and/or alternatively, the enterprise server 210 may utilize metadata included in the transmission of the product barcode image to identify relevant coupon offers. The metadata may include a store location, a retailer brand, a product manufacturer, the supplier, a time or date, and/or the like.

In some embodiments, the enterprise server 210 may include and/or utilize a database of coupon offer information that has been provided and/or uploaded by one or more suppliers. The enterprise 210 may also retrieve coupon offer information from the supplier server 208 and/or another computing device or storage location associated with a third-party coupon provider.

The enterprise server 210 may be used to authenticate and/or validate coupon offer redemptions. For example, the retailer server 206 may transmit transaction and/or coupon offer information to the enterprise server 210 during a transaction involving coupon offers. The enterprise server 210 may confirm or reject the authenticity and/or validity of a wallet barcode scanned at a point-of-sale terminal (and/or the coupon information associated with a wallet barcode). The enterprise server 210 may provide a decision to the retailer server 206 of whether to authorize the transaction or deny the transaction based on an analysis of the received information.

In some embodiments, the enterprise server 210 may generate wallet barcodes based on selected coupon offers that a shopper wishes to redeem in a transaction. The enterprise server 210 may provide a generated wallet barcode to the user device 202 and/or directly the retailer server 206 for redemption.

Once a transaction has been completed at a point-of-sale terminal, the enterprise server 210 may receive payment information, transaction information, and/or coupon offer information from one or more of the user device 202 and the retailer server 206. This received information may be stored, processed for clearing coupon offer redemptions, and/or processed for reporting purposes. As such, the enterprise server 210 may transmit one or more portions of this received information to one or more of the user device 202, the retailer server 206, and the supplier server 208. For example, the enterprise server 210 may transmit coupon redemption information to the supplier server 208 for invoicing and clearing purposes. The enterprise server 210 may calculate an amount owed by the supplier and to each retailer at which coupon offers have been redeemed.

The enterprise server 210 may also generate a variety of reports for one or more of the shopper, the retailer, and the supplier. As such, the enterprise server 210 may transmit various reports, graphs, recommendations, charts, audits, invoices, payment amounts, media content, and/or other information associated with coupon redemption operations to one or more of the user device 202, the retailer server 206, and the supplier server 208 throughout the coupon redemption processes described herein.

For example, the enterprise server 210 may generate the invoices to the supplier associated with coupon offers redeemed at one or more retailers. Upon receipt of the funds, the enterprise server may arrange for payment to the retailer of the cleared coupon offers. The supplier and/or the retailer may pay a processing fee for the clearing of the coupon offers, which may be retained by the enterprise server (or its owner), for example via a deduction applied to the payment to the retailer or a per coupon surcharge added to the invoice to the supplier.

The enterprise server 210 may permit a network administrator to address issues raised by the shopper, the retailer, and/or the supplier. Each of the shopper, the retailer, and/or the supplier may generate and submit to the enterprise server 210 support tickets during the coupon redemption operations described herein. The support tickets may include information associated with technical problems, compliance problems, negligence, audits, invoices, reports, and/or other user issues.

Method Descriptions

Figure 11:
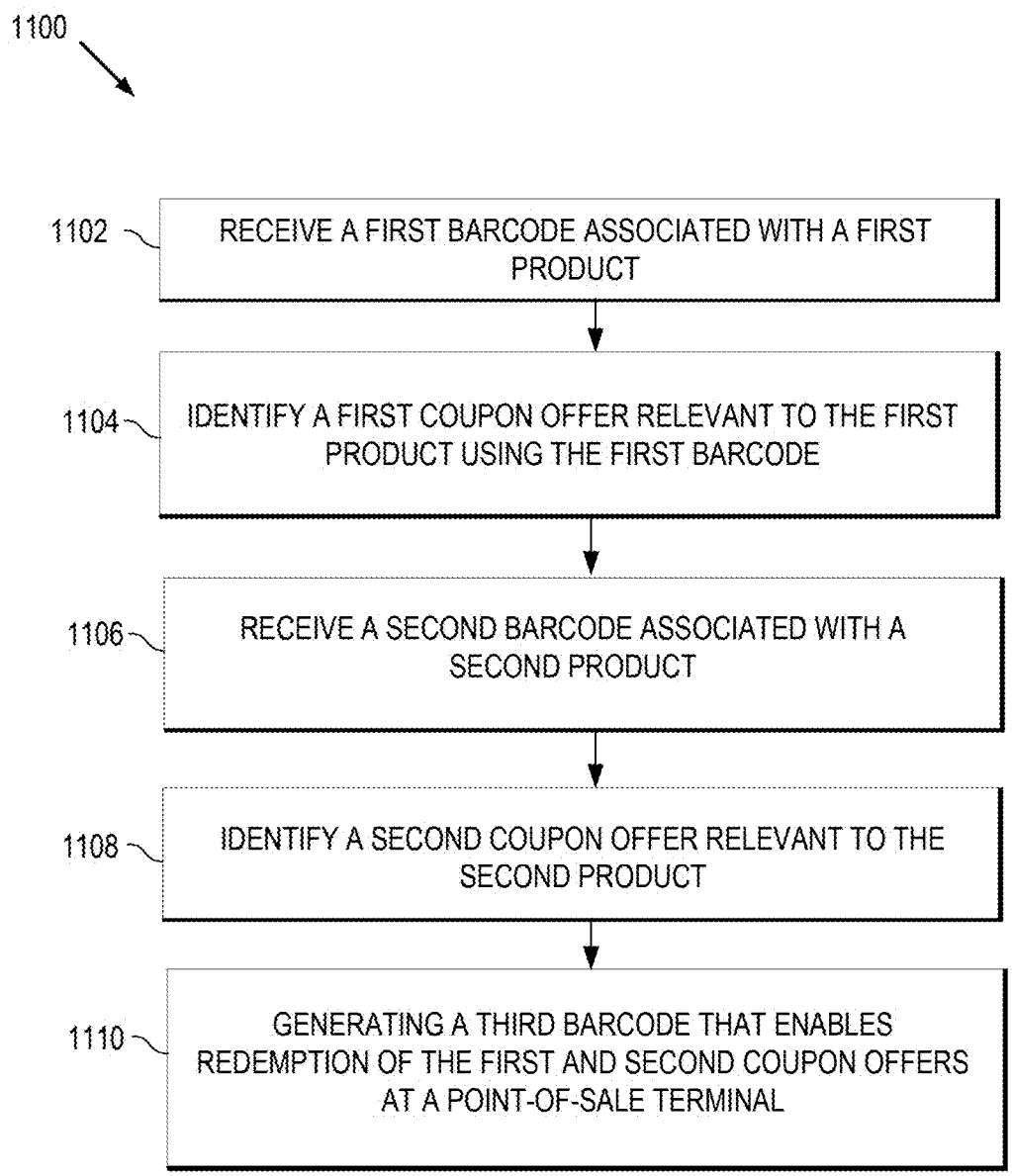
FIG. 11 shows an exemplary method of performing operations associated with generating a unique barcode for redemption of multiple coupon offers in accordance with some embodiments of the disclosure.

FIG. 11 shows an exemplary method 1100 for performing operations associated with consolidating multiple coupon offers into one redeemable bar code as described herein. At block 1102, a first barcode associated with a first product is received. At block 1104, a first coupon offer relevant to the first product is identified using the first barcode. At block 1106, a second barcode associated with a second product is received. At block 1108, a second coupon offer relevant to the second product is identified. At block 1110, a third barcode is generated for redemption of the first and second coupon offers.

Further Comments

While various implementations in accordance with the disclosed principles have been described above, it should be understood that they have been presented by way of example only, and are not limiting. Thus, the breadth and scope of the implementations should not be limited by any of the above-described exemplary implementations, but should be defined only in accordance with the claims and their equivalents issuing from this disclosure. Furthermore, the above advantages and features are provided in described implementations, but shall not limit the application of such issued claims to processes and structures accomplishing any or all of the above advantages.

Various terms used herein have special meanings within the present technical field. Whether a particular term should be construed as such a "term of art," depends on the context in which that term is used. "Connected to," "in communication with," "communicably linked to," "in communicable range of" or other similar terms should generally be construed broadly to include situations both where communications and connections are direct between referenced elements or through one or more intermediaries between the referenced elements, including through the Internet or some other communicating network. "Network," "system," "environment," and other similar terms generally refer to networked computing systems that embody one or more aspects of the present disclosure. These and other terms are to be construed in light of the context in which they are used in the present disclosure and as those terms would be understood by one of ordinary skill in the art would understand those terms in the disclosed context. The above definitions are not exclusive of other meanings that might be imparted to those terms based on the disclosed context.

Words of comparison, measurement, and timing such as "at the time," "equivalent," "during," "complete," and the like should be understood to mean "substantially at the time," "substantially equivalent," "substantially during," "substantially complete," etc., where "substantially" means that such comparisons, measurements, and timings are practicable to accomplish the implicitly or expressly stated desired result.

Additionally, the section headings herein are provided for consistency with the suggestions under 37 C.F.R. 1.77 or otherwise to provide organizational cues. These headings shall not limit or characterize the implementations set out in any claims that may issue from this disclosure. Specifically and by way of example, although the headings refer to a "Technical Field," such claims should not be limited by the language chosen under this heading to describe the so-called technical field. Further, a description of a technology in the "Background" is not to be construed as an admission that technology is prior art to any implementations in this disclosure. Neither is the "Summary" to be considered as a characterization of the implementations set forth in issued claims. Furthermore, any reference in this disclosure to "implementation" in the singular should not be used to argue that there is only a single point of novelty in this disclosure. Multiple implementations may be set forth according to the limitations of the multiple claims issuing from this disclosure, and such claims accordingly define the implementations, and their equivalents, that are protected thereby. In all instances, the scope of such claims shall be considered on their own merits in light of this disclosure, but should not be constrained by the headings herein.

Lastly, although similar reference numbers may be used to refer to similar elements for convenience, it can be appreciated that each of the various example implementations may be considered distinct variations.

The invention claimed is:

1. A method, comprising:

detecting, using an input device of a user device, identifying indicia associated with one or more product;

identifying, using a local computer readable storage or a communications interface of the user device, at least one coupon offer relevant to the product based on the identifying indicia;

displaying, using a display of the user device, an option to select the at least one coupon offer to a user;

receiving the user's selection of the displayed at least one coupon offer;

storing, in the local computer readable storage, a plurality of coupon offers selected by the user;

receiving an instruction from the user to recall the stored user selection;

receiving, using the communications interface, an identifier associated with a point-of-sale terminal;

transmitting, using a communications interface, information representing the plurality of coupon offers selected by the user to an enterprise server;

receiving, using the communications interface, a unique redemption code associated with the plurality of coupon offers from the enterprise server; and providing the unique redemption code to the point-of-sale terminal for redemption of the coupon offers associated with the user selection by displaying a barcode on the display or by using the communications interface, wherein the redemption code is generated based on the identifier.

2. The method of claim 1, wherein the redemption code includes a barcode, and the providing includes displaying the barcode.

3. The method of claim 1, further comprising
determining a location of the user device;
identifying a plurality of retail locations within a predetermined proximity of the user device; and
selecting a point-of-sale terminal associated with a closest of the retail locations.

4. The method of claim 1, further comprising transmitting, using the communication interface, the stored user selection to the enterprise server.

5. The method of claim 1, further comprising transmitting identification information to the enterprise server, wherein the unique redemption code is associated with the identification information.

6. The method of claim 5, wherein the identification information includes at least one of an identification information includes a location of the user device.

7. The method of claim 6, further comprising determining whether to generate the unique redemption code based on the location of the user device.

8. The method of claim 5, wherein the identification information includes at least one of an identification number associated with a point-of-sale terminal, an identification number associates with an employee operating the point-of-sale terminal, and an identification number associated with a retail store.

9. The method of claim 1, further comprising transmitting, by a retailer server associated with the point-of-sale terminal, the unique redemption code to the enterprise server for validation.

10. The method of claim 9, further comprising authenticating, by the enterprise server, the coupon offers during a transaction at the point-of-sale terminal.

11. The method of claim 9, further comprising transmitting identification information to the enterprise server, wherein
the unique redemption code is associated with the identification information, and
the authenticating includes determining whether to authorize the transaction based on an analysis of received information.

12. The method of claim 1, wherein the identifying step includes transmitting the identifying indicia to the enterprise server.

13. The method of claim 12, further comprising storing, at the enterprise server, product information associated with the identifying indicia to track coupon offers associated with the user.

14. The method of claim 13, further comprising providing targeted coupon offers based on aggregated coupon offers associated with the user.

15. A user device, comprising:
an input device configured to detect identifying indicia of one or more products;
a communications interface configured to:
receive at least one coupon offer relevant to the identified indicia, and
receive an identifier associated with a point-of-sale terminal;
a display configured to display, in response to the communications interface receiving the at least one coupon offer, an option to select the at least one coupon offer to a user;
a computer readable storage configured to store a plurality of coupon offers selected by the user; and
a processor configured to:
receive an instruction from the user to recall the stored user selection from the computer readable storage,
cause the communications interface to transmit information representing the plurality of coupon offers selected by the user to an enterprise server, and
in response to receiving a unique redemption code associated with the plurality of coupon offers from the enterprise server, provide the unique redemption code to the point-of-sale terminal for redemption of the coupon offers associated with the user selection by displaying a barcode on the display or by using the communications interface, wherein
the redemption code is generated based on the identifier.

16. The user device of claim 15, wherein the processor is configured provide the redemption code to the point-of-sale terminal by displaying the barcode on the display.

17. The user device of claim 15, wherein the processor is configured to provide the redemption code to the point-of-sale terminal using the communications interface.

18. The user device of claim 15, further comprising a location determination interface configured to determine a location of the user device, wherein the processor is configured to use the location determination interface to identify a point-of-sale terminal of a plurality of retail locations within a predetermined proximity of the user device.

19. The user device of claim 15, wherein the input device includes a camera.

20. The user device of claim 15, wherein the processor is configured to compare the identified indicia to information of a database that includes information associated with a coupon offer relevant to the associated product.

21. The user device of claim 15, wherein the processor is configured to cause the communications interface to transmit the stored user selection to the enterprise server.

* * * * *